United States Patent
Kanai et al.

(10) Patent No.: US 12,347,826 B2
(45) Date of Patent: Jul. 1, 2025

(54) SOLID ELECTROLYTE

(71) Applicants: KANEKA CORPORATION, Osaka (JP); OSAKA UNIVERSITY, Osaka (JP)

(72) Inventors: Kazuaki Kanai, Osaka (JP); Makio Naito, Osaka (JP)

(73) Assignees: KANEKA CORPORATION, Osaka (JP); OSAKA UNIVERSITY, Osaka (JP)

(*) Notice: Subject to any disclaimer, the term of this patent is extended or adjusted under 35 U.S.C. 154(b) by 552 days.

(21) Appl. No.: 17/880,195

(22) Filed: Aug. 3, 2022

(65) Prior Publication Data

US 2022/0376294 A1 Nov. 24, 2022

Related U.S. Application Data

(63) Continuation of application No. PCT/JP2021/003720, filed on Feb. 2, 2021.

(30) Foreign Application Priority Data

Feb. 5, 2020 (JP) ................. 2020-018115

(51) Int. Cl.
*H01M 10/0562* (2010.01)
*C04B 35/48* (2006.01)
*H01M 10/0525* (2010.01)

(52) U.S. Cl.
CPC ......... *H01M 10/0562* (2013.01); *C04B 35/48* (2013.01); *C04B 2235/3248* (2013.01);
(Continued)

(58) Field of Classification Search
CPC ............... H01M 10/0562; C04B 35/48; C04B 2235/3548; C04B 2235/445; C04B 2235/761; C04B 2235/764
See application file for complete search history.

(56) References Cited

U.S. PATENT DOCUMENTS

2015/0118571 A1 4/2015 Liu et al.
2016/0049688 A1 2/2016 Sung et al.
(Continued)

FOREIGN PATENT DOCUMENTS

CN 104591231 A 5/2015
CN 107732295 A 2/2018
(Continued)

OTHER PUBLICATIONS

Extended European Search Report issued in related European Patent Application No. 19855682.1, dated May 2, 2022 (8 pages).
International Search Report issued in corresponding International Application No. PCT/JP2021/003720 mailed Mar. 16, 2021 (5 pages).
(Continued)

*Primary Examiner* — Sarah A. Slifka
(74) *Attorney, Agent, or Firm* — Osha Bergman Watanabe & Burton LLP

(57) ABSTRACT

A solid electrolyte which contains a garnet-type composite metal oxide phase (L) and shows an excellent lithium ion conductivity is provided. The solid electrolyte contains a garnet-type composite metal oxide phase (L) and a phase (D) different from the phase (L). The phase (L) contains Li, La, Zr, O, and Ga, and an Li site in the phase (L) is substituted with the Ga. A lattice constant of the solid electrolyte is not smaller than 12.96 Å. The phase (D) contains at least one of LiF, $BaZrO_3$, $YF_3$, $SrF_2$, and $ScF_3$.

10 Claims, 21 Drawing Sheets

(52) U.S. Cl.
CPC .. *C04B 2235/445* (2013.01); *C04B 2235/761* (2013.01); *C04B 2235/764* (2013.01); *H01M 10/0525* (2013.01); *H01M 2300/0077* (2013.01)

(56) References Cited

U.S. PATENT DOCUMENTS

| | | |
|---|---|---|
| 2016/0308244 A1 | 10/2016 | Badding et al. |
| 2017/0194663 A1 | 7/2017 | Zhamu et al. |
| 2018/0219253 A1 | 8/2018 | Ohta |
| 2018/0309163 A1 | 10/2018 | Kim et al. |
| 2021/0119251 A1 | 4/2021 | Niwa et al. |
| 2021/0194045 A1 | 6/2021 | Beck et al. |

FOREIGN PATENT DOCUMENTS

| | | |
|---|---|---|
| CN | 110176627 A | 8/2019 |
| JP | 2014022319 A | 2/2014 |
| JP | 2017091788 A | 5/2017 |
| JP | 2018065704 A | 4/2018 |
| JP | 2018516219 A | 6/2018 |
| WO | 2017002467 A1 | 1/2017 |
| WO | 2019/189275 A1 | 10/2019 |

OTHER PUBLICATIONS

Written Opinion issued in corresponding International Application No. PCT/JP2021/003720 mailed Mar. 16, 2021 (3 pages).

Hao, Shimeng et al., "Solid-state lithium battery chemistries achieving high cycle performance at room temperature by a new garnet-based composite electrolyte", Journal of Power Sources, May 12, 2018, vol. 393, pp. 128-134 (7 pages).

FIG. 4B ESB(Composition contrast)
FIG. 4A SE

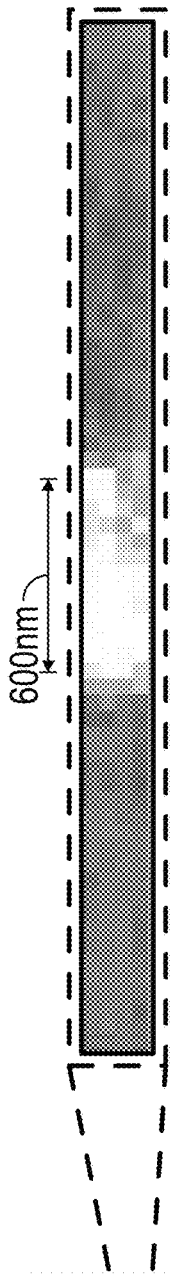
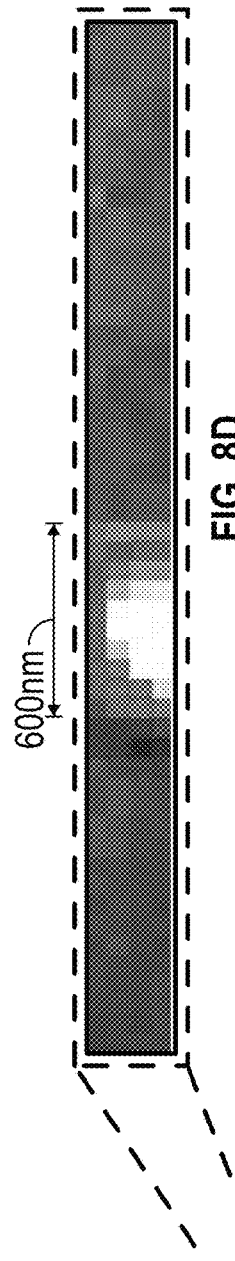
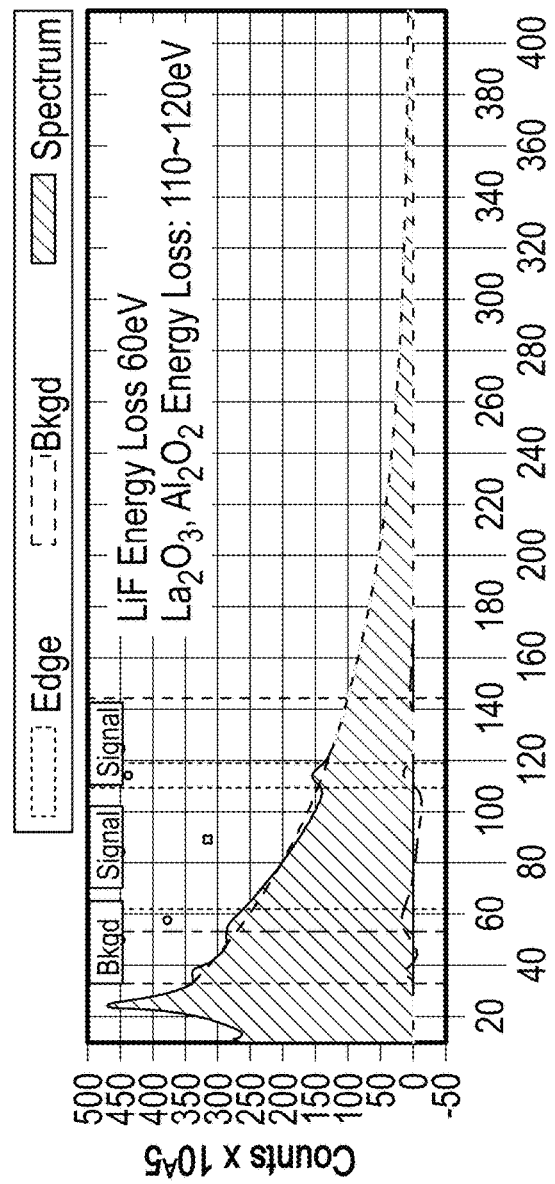
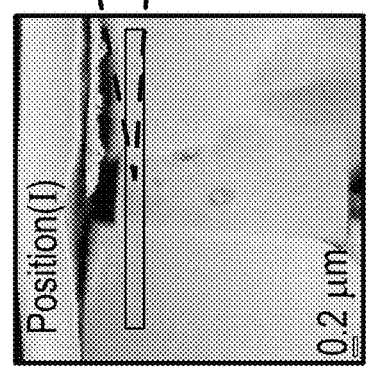
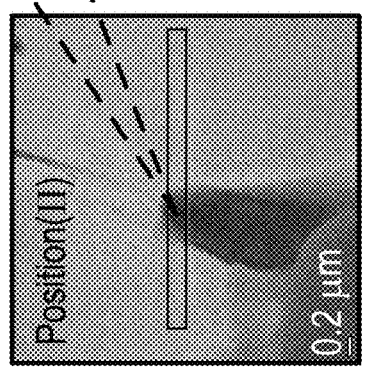

SOLID ELECTROLYTE

TECHNICAL FIELD

One or more embodiments the present invention relate to a solid electrolyte.

BACKGROUND

Research and development of Li ion secondary batteries have been actively conducted for mobile devices, hybrid automobiles, electric automobiles, and household power storage applications. Li ion secondary batteries used in these fields are required to have high safety, long-term cycle stability, high energy density, and the like.

Among them, all-solid-state batteries in which solid electrolytes are used have been attracting attention because of the high safety of the all-solid-state batteries. For example, a lithium ion conductor LIC of Patent Literature 1 is produced by first producing an ion conductor, and then mixing and heating a lithium halide and the ion conductor. For example, in the case of LLZ-MgSr powder obtained by performing substitution with elements Mg and Sr on an ion conductor $Li_7La_3Zr_2O_{12}$, raw materials ($Li_2CO_3$, MgO, $La(OH)_3$, $SrCO_3$, $ZrO_2$, $SrCO_3$, and $ZrO_2$) including each element of LLZ-MgSr are mixed for 15 hours, and the mixture is sintered at 1000° C. for 10 hours, to make a sintered product. Then, powder of a lithium halide (for example, LiI) is further mixed with the sintered product, to obtain mixture powder. Then, the mixture powder is pressed together with a stainless current collector by a press machine, to obtain a green compact. Then, the green compact is heated at 80° C. for 17 hours.

PATENT LITERATURE

Patent document 1: JP2017-91788A

SUMMARY

One or more embodiments of the present invention aim to provide an $Li^+$ ion conductive solid electrolyte different from the one in the Patent document 1, which contains a garnet-type composite metal oxide phase (L) and shows an excellent lithium ion conductivity.

One or more embodiments of the present invention are as follows.

[1] A solid electrolyte comprising:
  a garnet-type composite metal oxide phase (L); and
  a phase (D) different from the phase (L), wherein
  the phase (L) contains Li, La, Zr, O, and Ga,
  an Li site in the phase (L) is substituted with the Ga,
  a lattice constant of the solid electrolyte is not smaller than 12.96 Å, and
  the phase (D) contains at least one selected from the group consisting of LiF, $BaZrO_3$, $YF_3$, $SrF_2$, and $ScF_3$.

[2] The solid electrolyte according to [1], wherein when the phase (D) contains the LiF, the phase (D) further contains at least one of elements Al and La.

[3] The solid electrolyte according to [1] or [2], wherein the phase (D) is present in at least a part of an interface of the phase (L).

[4] A solid electrolyte comprising a garnet-type composite metal oxide phase (L), wherein
  the solid electrolyte has been synthesized by performing mechanochemical treatment on a raw material mixture containing Li source powder, La source powder, Zr source powder, and Ga source powder in the presence of a reaction aid containing a mixture of $LiX^1$ and $MX^2_p$ (each of $X^1$ and $X^2$ is F, Cl, Br, or I, $X^1$ and $X^2$ may be identical to each other or different from each other, M is Ba, Y, Sr, or Sc, and p is a value equal to an atomic valence of M), and
  the phase (L) contains Li, La, Zr, O, and Ga,
  a part of an Li site in the phase (L) is substituted with the Ga.

[5] The solid electrolyte according to [4], wherein each of the $X^1$ and the $X^2$ is F.

[6] The solid electrolyte according to [4] or [5], wherein
  the solid electrolyte further comprises a phase (D) different from the phase (L),
  the phase (D) contains a compound containing at least one of constituent elements of the reaction aid, and
  the phase (D) is present in at least a part of an interface of the phase (L).

[7] The solid electrolyte according to any one of [1] to [6], wherein
  an $Li^+$ ion conductivity of the solid electrolyte is not lower than $1.0 \times 10^{-4}$ S/cm.

[8] The solid electrolyte according to any one of [4] to [7], wherein
  an amount of the reaction aid with respect to a total of 100 parts by mass of the raw material mixture is not larger than 15 parts by mass.

[9] The solid electrolyte according to any one of [4] to [8], wherein
  the solid electrolyte has been sintered at 1100 to 1350° C. for 10 to 30 hours after the mechanochemical treatment.

The solid electrolyte of one or more embodiments of the present invention shows an excellent Li+ ion conductivity, therefore can be used as a component of an excellent solid electrolyte for a secondary battery.

BRIEF DESCRIPTION OF THE DRAWINGS

FIGS. 4A-B are substitutional photographs for a drawing obtained by SE (secondary electron) detector and ESB (energy selected backscatter) detector respectively, which show a cross-sectional TEM image of a pellet obtained by an example described below.

FIGS. 8A-E are drawings showing a cross-sectional TEM-EELS map of a pellet obtained by an example described below.

DETAILED DESCRIPTION

Figure 1B:
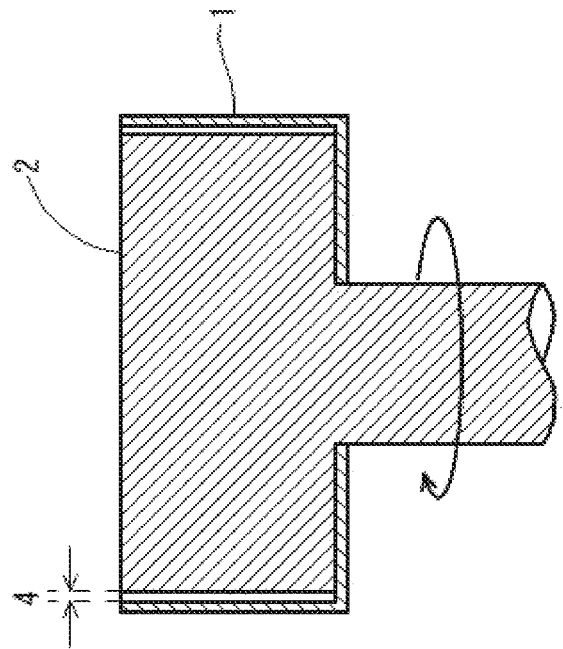
FIG. 1B is a cross-sectional view at A-A' of FIG. 1A.

A solid electrolyte of one or more embodiments of the present invention is a solid electrolyte including: a garnet-type composite metal oxide phase (L); and a phase (D) different from the phase (L). The phase (L) contains Li, La, Zr, O, and Ga. A part of an Li site in the phase (L) is substituted with the Ga. A lattice constant of the solid electrolyte is not smaller than 12.96 Å. The phase (D) contains at least one selected from the group consisting of LiF, $BaZrO_3$, $YF_3$, $SrF_2$, and $ScF_3$.

The garnet-type composite metal oxide phase (L) containing Li, La, Zr, and O can be ordinarily represented by a composition formula of $Li_7La_3Zr_2O_{12}$. The phase (L) may be a cubic crystal. The garnet-type composite metal oxide phase (L) further contains Ga with which a part of the Li site is substituted. Hereinafter, the garnet-type composite metal oxide may be referred to as "LLZ". In one or more embodiments of the present invention, the LLZ may be a cubic crystal.

The solid electrolyte of one or more embodiments of the present invention includes, in addition to the phase (L), the phase (D) different from the phase (L). The phase (D) contains at least one selected from the group consisting of LiF, $BaZrO_3$, $YF_3$, $SrF_2$, and $ScF_3$. In a preferable mode, in the case where the phase (D) contains LiF, the phase (D) further contains at least one of elements Al and La. At least one of the elements Al and La may be formed into an oxide. Examples of the oxide include Al oxide, La oxide, and a composite oxide of Al and La. Among them, in the case where the phase (D) contains LiF, the phase (D) may contain LiF and the element La, or LiF and the elements La and Al. The element La contained in the phase (D) is ordinarily derived from La source powder described later. Meanwhile, the element Al may be, for example, derived from a crucible or Al contained as impurities in raw material powders described later.

The presence of LiF, $BaZrO_3$, $YF_3$, $SrF_2$, and $ScF_3$ can be ascertained from: any of results of measurements performed through EDS (energy dispersive X-ray spectroscopy), XRD (X-ray diffraction), and TEM (transmission electron microscopy)-EELS (electron energy-loss spectroscopy); or an appropriate combination of these results.

The solid electrolyte of one or more embodiments of the present invention has a lattice constant of not smaller than 12.96 Å. Ordinarily, the lattice constant of LLZ partially substituted with Ga (hereinafter, Ga-substituted LLZ) is about 12.95 Å. The lattice constant of the solid electrolyte of one or more embodiments of the present invention is larger than the lattice constant of the Ga-substituted LLZ. The reason for this is not clear but is considered to be because, for example, a part of the Li site has been substituted with an element derived from a reaction aid component. The lattice constant may be not smaller than 12.97 Å, not smaller than 12.99 Å, or not smaller than 13.02 Å. The upper limit of the lattice constant is not particularly limited and may be, for example, 13.10 Å.

The phase (D) is present ordinarily in at least a part of an interface of the phase (L). That is, there may be a region in which phases (L) are present with a phase (D) interposed therebetween. In the region, the phases are present so as to be in contact with each other in the order of a phase (L), a phase (D), and a phase (L). When the phase (D) is present in at least a part of the interface of the phase (L), $Li^+$ ions can be favorably conducted from a phase (L) via a phase (D) to a phase (L).

The solid electrolyte of one or more embodiments of the present invention may be a powder or a molded product obtained by compression molding or the like of a powder (compression-molded product). The solid electrolyte may be a sintered product obtained by sintering the compression-molded product. The solid electrolyte of one or more embodiments of the present invention may have a relative density not lower than 60%, not lower than 70%, not lower than 80%, or not lower than 90%. The upper limit of the relative density may be 100% or about 95%.

The solid electrolyte of one or more embodiments of the present invention is obtained by performing mechanochemical treatment on a mixture of raw material powders in the presence of a predetermined reaction aid. In the mechanochemical treatment, the raw material powders are reacted with one another, whereby the LLZ can be produced. More specifically, the mechanochemical method can be performed by shearing the mixture of the raw material powders while compressing the mixture under a dry condition. Consequently, strain energy is accumulated in raw material powders, and the energy is self-released to be turned into thermal energy or consumed in surface modification, crystal structure transition, or a solid phase reaction. In one or more embodiments of the present invention, the raw material powders are subjected to the mechanochemical treatment in the presence of the predetermined reaction aid. Consequently, a reaction among the raw material powders can be promoted, and the $Li^+$ ion conductivity of the solid electrolyte that is obtained can be improved.

Figure 1A:
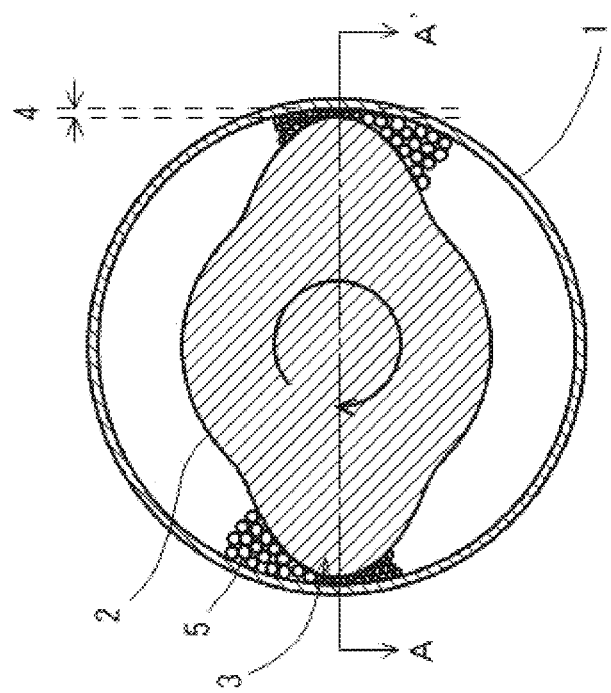
FIG. 1A is a cross-sectional view perpendicular to a rotation axis of a grinding mill capable of being used for a mechanochemical method.

More specifically, the mechanochemical treatment can be performed by shearing the reaction aid and the mixture containing the raw material powders while compressing the reaction aid and the mixture under a dry condition. An example of the method will be described with reference to the drawing. FIGS. 1A-B are schematic views of a grinding mill capable of exerting compressive force and shearing force to the reaction aid and the mixture of the raw material powders. FIG. 1A is a cross-sectional view perpendicular to a rotation axis, and FIG. 1B is a cross-sectional view at A-A' of FIG. 1A. The grinding mill in FIGS. 1A-B include a bottomed cylindrical container 1 and a rotor 2. The rotor 2 has end blades 3 which have smaller curvature than that of the inner circumference of the bottomed cylindrical container 1. A clearance 4 is provided between each end blade 3 and the inner circumference of the bottomed cylindrical container 1. When the rotor 2 is rotated, a mixture 5 of the raw material powders and the reaction aid receives compressive force and shearing force at the clearance 4.

Regarding a condition of the mechanochemical treatment, a condition for an excessively weak reaction is not preferable since such a condition does not lead to occurrence of a reaction among the raw material powders, and meanwhile, a condition for an excessively strong reaction is not preferable since such a condition leads to amorphization of an LLZ crystal that has been generated once. When the condition of the mechanochemical treatment is inappropriate, the condition only has to be changed as appropriate according to the type and the amount of each raw material, and the type and the amount of a flux, depending on the reason for the inappropriateness (occurrence of no reaction, amorphization, or the like). For example, the condition is set as follows.

A range of the clearance differs depending on the amount of the raw material powders, the difference between the curvature of the end blade of the rotor and the curvature of the inner circumference of the container, processing power of the rotor, and the like. For example, the clearance may be shorter than 1 mm. With this clearance, compressive force and shearing force can be sufficiently exerted to the mixture of the raw material powders, and the reaction among the raw material powders is promoted. The clearance may be not longer than 0.9 mm or not longer than 0.8 mm. Regarding the lower limit of the clearance, the clearance is, for example, not shorter than 100 Jim and preferably not shorter than 0.5 mm.

Rotation power of the rotor with respect to the total mass of the raw material powders is, for example, not lower than 0.05 kW/g. By increasing the rotation power, a solid phase reaction among the raw material powders is promoted. The rotation power may be not lower than 0.06 kW/g, not lower than 0.08 kW/g, or not lower than 0.1 kW/g. The upper limit of the rotation power is not particularly limited and is, for example, 0.5 kW/g. The rotation rate of the rotor differs depending on the size of the device, the shape of the rotor, and the like. If the rotation power falls within the above range, the rotation rate is, for example, 2000 to 6000 rpm and preferably 3000 to 5000 rpm.

A rotation time of the rotor can be set as appropriate according to the rotation power of the rotor, and is, for example, not shorter than 5 minutes, preferably not shorter than 10 minutes, and more preferably not shorter than 15 minutes. By rotating the rotor for at least 5 minutes (preferably at least 10 minutes), compressive force and shearing force can be sufficiently exerted to the raw material powders. Consequently, the solid phase reaction among the raw material powders progresses, whereby the LLZ can be obtained. The upper limit of the rotation time of the rotor is not particularly limited. However, if the rotation time is excessively long, the crystallinity of the LLZ decreases instead, resulting in consumption of extra energy. Considering this, the rotation time may be not longer than 40 minutes or not longer than 30 minutes.

In the mechanochemical treatment, strain energy is accumulated in each raw material powder by shearing, and the energy is self-released to turn into thermal energy so that heat is generated. Therefore, the producing method of one or more embodiments of the present invention can also be performed without heating by means of an external heat source. The mechanochemical treatment may be performed, in a state where heat is generated or by cooling by means of water cooling or the like. In the mechanochemical treatment, a reaching temperature of the cylindrical container may be, for example, not lower than 50° C. and preferably not lower than 130° C. Meanwhile, the reaching temperature may be not higher than 500° C.

An atmosphere in the mechanochemical treatment is not particularly limited and may be either an oxygen-containing atmosphere such as an air atmosphere, or an inert gas atmosphere. Examples of the inert gas include gases of nitrogen, helium, argon, and the like (nitrogen gas is particularly preferable).

The material of the aforementioned bottomed cylindrical container is not particularly limited, and examples of the material include stainless steels such as SUS304, carbon steel, and the like. Further, a coating for preventing impurities from entering the LLZ to be generated, may be provided. The inner diameter of the container is, for example, 50 to 500 mm. The number of the end blades only has to be not smaller than 1, is preferably not smaller than 2, and is ordinarily not larger than 8.

The raw material powders are Li source powder, La source powder, Zr source powder, and Ga source powder. As the Li source powder, the La source powder, the Zr source powder, and the Ga source powder, powders of, for example, oxides, carbonates, hydroxides, chlorides, alkoxides, or the like of respective metals (Li, La, Zr, and Ga) can be used. The Li source powder may be powder of Li oxide or Li carbonate, the La source powder may be powder of La oxide or La hydroxide, the Zr source powder may be powder of Zr oxide or Zr hydroxide, and the Ga source powder may be powder of Ga oxide or Ga hydroxide. Each of the Li source powder, the La source powder, the Zr source powder, and the Ga source powder is preferably powder of a corresponding metal oxide (Li oxide, La oxide, Zr oxide, or Ga oxide).

The ratio of the Li source powder, the La source powder, the Zr source powder, and the Ga source powder that are used, may be a stoichiometric ratio in a target composition. In particular, the mole ratio of the amount of Ga to the amount of Li may be not lower than 0.02. With this mole ratio, a crystal system of the LLZ that is obtained can be made as a cubic crystal. The mole ratio may be not lower than 0.03, not lower than 0.04, not lower than 0.06, or not lower than 0.08. The upper limit thereof is not limited, and the mole ratio is, for example, not higher than 0.2.

It is also preferable to appropriately adjust powder properties of each raw material powder, and, for example, the specific surface area $S_w$ (m$^2$/g) of the raw material powder measured by the BET method is preferably 0.5 to 25 m$^2$/g. Further, a specific surface area diameter $d_{BET}$ (nm) of the raw material powder can be calculated from the specific surface area $S_w$ according to the following expression.

$$d_{BET} = 6/(\rho \cdot S_w)$$

(in the above expression, $\rho$ represents a theoretical density)

The specific surface area diameter $d_{BET}$ (nm) of the Li source powder may be 250 to 400 nm, the specific surface area diameter $d_{BET}$ (nm) of the La source powder may be 30 to 150 nm, the specific surface area diameter $d_{BET}$ (nm) of the Zr source powder may be 20 to 100 nm, and the specific surface area diameter $d_{BET}$ (nm) of the Ga source powder may be 20 to 100 nm.

The reaction aid contains a mixture of $LiX^1$ and $MX^2_p$ (each of $X^1$ and $X^2$ is F, Cl, Br, or I, $X^1$ and $X^2$ may be identical to each other or different from each other, M is Ba, Y, Sr, or Sc, and p is a value equal to the atomic valence of M). The proportion of the amount of $LiX^1$ with respect to the total amount of $LiX^1$ and $MX^2_p$ may be not lower than 40 mol %. If the proportion of $LiX^1$ is increased, the Li$^+$ ion conductivity of the solid electrolyte that is obtained, can be improved. The proportion of $LiX^1$ may be not lower than 50 mol % or not lower than 60 mol %. Regarding the upper limit of the proportion, the proportion is, for example, not higher than 95 mol % and can be not higher than 90 mol %.

Each of $X^1$ and $X^2$ may be F. M may be Ba or Sr. The mixture of $LiX^1$ and $MX^2_p$ may be a mixture of LiF and $BaF_2$ or a mixture of LiF and $SrF_2$.

It is also preferable to appropriately adjust a BET specific surface area diameter of the compound contained in the reaction aid. For example, a specific surface area diameter $d_{BET}$ obtained from the BET specific surface area of $BaF_2$ is, for example, 100 to 200 nm, and a specific surface area diameter $d_{BET}$ obtained from the BET specific surface area of LiF is, for example, 550 to 700 nm.

The amount of the reaction aid with respect to 100 parts by mass of the aforementioned mixture of the raw material powders including the Li source powder, the La source powder, the Zr source powder, and the Ga source powder, may be not larger than 15 parts by mass, not larger than 12 parts by mass, or not larger than 10 parts by mass. Meanwhile, the amount can be not smaller than 4 parts by mass. Although a procedure of adding the reaction aid is not particularly limited, a procedure in which the reaction aid is added to the aforementioned mixture of the raw material powders and mechanochemical treatment is initiated, is preferable.

Although the LLZ is generated by merely performing the aforementioned mechanochemical treatment, sintering may be performed after the mechanochemical treatment. The sintering enables the $Li^+$ ion conductivity to be more improved. The temperature for the sintering may be 1100 to 1350° C., 1150 to 1300° C., or 1200 to 1300° C. The time for the sintering may be 10 to 30 hours, 12 to 27 hours, or 15 to 25 hours. It is also preferable to perform sintering after the mixture having been subjected to the mechanochemical treatment is molded.

That is, the solid electrolyte of one or more embodiments of the present invention capable of being produced through the above-described method can also be said to be a solid electrolyte including a garnet-type composite metal oxide phase (L), wherein the solid electrolyte has been synthesized by performing mechanochemical treatment on the raw material mixture containing Li source powder, La source powder, Zr source powder, and Ga source powder in the presence of the reaction aid containing the mixture of $LiX^1$ and $MX^2_p$ (each of $X^1$ and $X^2$ is F, Cl, Br, or I, $X^1$ and $X^2$ may be identical to each other or different from each other, M is Ba, Y, Sr, or Sc, and p is a value equal to the atomic valence of M), the phase (L) contains Li, La, Zr, O, and Ga, and a part of the Li site in the phase (L) is substituted with the Ga. Although the reaction aid may contain another component other than the mixture of $LiX^1$ and $MX^2_p$, the reaction aid may be the mixture of $LiX^1$ and $MX^2_p$. The total amount of $LiX^1$ and $MX^2_p$ in the reaction aid may be not lower than 90% by mass, not lower than 95% by mass, or 100% by mass.

It is preferable that, by using the above reaction aid, a phase (D) which is different from the phase (L) and which contains a compound containing at least one of constituent elements of the reaction aid, is present in at least a part of the interface of the phase (L).

When the reaction aid contains the mixture of LiF and $BaF_2$, the compound containing at least one of the constituent elements of the reaction aid may contain at least one of LiF and $BaZrO_3$. When the compound containing at least one of the constituent elements of the reaction aid contains LiF, it is more preferable that the phase (D) further contains at least one of the elements Al and La. In particular, the compound containing at least one of the constituent elements of the reaction aid may contain $BaZrO_3$ in the case that the following conditions are satisfied. The conditions are that the Li source powder, the La source powder, the Zr source powder, and the Ga source powder are used such that a target chemical composition is expressed as $Li_{7-x}Ga_{x/3}La_3Zr_2O_{12}$ (0<x≤1.5, preferably 0.3≤x≤0.8), the reaction aid is a mixture of LiF and $BaF_2$ (in particular, the mole ratio of LiF to $BaF_2$ is 50:50 to 90:10 and preferably 80:20 to 90:10), and the amount of the reaction aid per 100 parts by mass of the mixture of the raw material powders is 8 to 10 parts by mass. The compound containing at least one of the constituent elements of the reaction aid may contain LiF and $BaZrO_3$ in the case that the following conditions are satisfied. The conditions are that the Li source powder, the La source powder, the Zr source powder, and the Ga source powder are used such that a target chemical composition is expressed as $Li_{7-x}Ga_{x/3}La_3Zr_2O_{12}$ (0<x≤1, preferably 0.3≤x≤0.8), the reaction aid is a mixture of LiF and $BaF_2$ (in particular, the mole ratio of LiF to $BaF_2$ is 80:20 to 90:10), the amount of the reaction aid with respect to 100 parts by mass of the mixture of the raw material powders is 8 to 10 parts by mass, and sintering is further performed at 1100 to 1350° C. for 10 to 30 hours after the mechanochemical treatment.

When the reaction aid contains a mixture of LiF and $YF_3$, the compound containing at least one of the constituent elements of the reaction aid may be $YF_3$. In particular, the compound containing at least one of the constituent elements of the reaction aid may contain $YF_3$ in the case that the following conditions are satisfied. The conditions are that the Li source powder, the La source powder, the Zr source powder, and the Ga source powder are used such that a target chemical composition is expressed as $Li_{7-x}Ga_{x/3}La_3Zr_2O_{12}$ (0<x≤1, preferably 0.3≤x≤0.8), the reaction aid is a mixture of LiF and $YF_3$ (in particular, the mole ratio of LiF to $YF_3$ is 80:20 to 90:10), the amount of the reaction aid with respect to 100 parts by mass of the mixture of the raw material powders is 8 to 10 parts by mass, and sintering is further performed at 1100 to 1350° C. for 10 to 30 hours after the mechanochemical treatment.

When the reaction aid contains a mixture of LiF and $SrF_2$, the compound containing at least one of the constituent elements of the reaction aid may be $SrF_2$. In particular, the compound containing at least one of the constituent elements of the reaction aid may contain $SrF_2$, or $Li_2O$ along with $SrF_2$ in the case that the following conditions are satisfied. The conditions are that the Li source powder, the La source powder, the Zr source powder, and the Ga source powder are used such that a target chemical composition is expressed as $Li_{7-x}Ga_{x/3}La_3Zr_2O_{12}$ (0<x≤1, preferably 0.3≤x≤0.8), the reaction aid is a mixture of LiF and $SrF_2$ (in particular, the mole ratio of LiF to $SrF_2$ is 80:20 to 90:10), the amount of the reaction aid with respect to 100 parts by mass of the mixture of the raw material powders is 8 to 10 parts by mass, and sintering is further performed at 1100 to 1350° C. for 10 to 30 hours after the mechanochemical treatment.

When the reaction aid contains a mixture of LiF and $ScF_3$, the compound containing at least one of the constituent elements of the reaction aid may be $ScF_3$. In particular, the compound containing at least one of the constituent elements of the reaction aid may contain $ScF_3$ in the case that the following condition are satisfied. The conditions are that the Li source powder, the La source powder, the Zr source powder, and the Ga source powder are used such that a target chemical composition is expressed as $Li_{7-x}Ga_{x/3}La_3Zr_2O_{12}$ ($0<x\leq1$, preferably $0.3\leq x\leq0.8$), the reaction aid is a mixture of LiF and $ScF_3$ (in particular, the mole ratio of LiF to $ScF_3$ is 80:20 to 90:10), the amount of the reaction aid with respect to 100 parts by mass of the mixture of the raw material powders is 8 to 10 parts by mass, and sintering is further performed at 1100 to 1350° C. for 10 to 30 hours after the mechanochemical treatment.

An $Li^+$ ion conductivity at room temperature of the solid electrolyte of one or more embodiments of the present invention obtained by impedance measurement, can be not lower than $1.0\times10^{-4}$ S/cm, and is preferably not lower than $1.5\times10^{-4}$ S/cm and more preferably not lower than $2.0\times10^{-4}$ S/cm. The upper limit of the $Li^+$ ion conductivity is not limited, and the $Li^+$ ion conductivity is, for example, not higher than $8.0\times10^{-4}$ S/cm. An activation energy Ea of the solid electrolyte obtained by impedance measurement can be not higher than 0.4 eV, and is preferably not higher than 0.35 eV and more preferably not higher than 0.30 eV. The lower limit of the activation energy Ea may be, for example, 0.10 eV. The aforementioned $Li^+$ ion conductivity may be measured with the solid electrolyte of one or more embodiments of the present invention being in the form of a molded product having a relative density that falls within the aforementioned preferable relative density range.

The present application claims the benefit of the priority based on Japanese patent application No. 2020-018115 filed on Feb. 5, 2020. All the contents described in Japanese Patent Application No. 2020-018115 filed on Feb. 5, 2020 are incorporated herein by reference.

EXAMPLES

One or more embodiments of the present invention will be described in more detail below by means of examples. One or more embodiments of the present invention are not limited by the following examples, and can also be carried out with appropriate modifications being made within the scope of the gist described above and below, and any of these modifications are included in the technical scope of one or more embodiments of the present invention.

Production Example 1-1

As raw materials of $Li_{5.5}Ga_{0.5}La_3Zr_2O_{12}$, a total of 20 g of powders of $Li_2O$, $La_2O_3$, $ZrO_2$, and $Ga_2O_3$ respectively having the following characteristics was weighed at a stoichiometric ratio such that the composition of a composite metal oxide that was generated was expressed as $Li_{5.5}Ga_{0.5}La_3Zr_2O_{12}$.

$Li_2O$: $Li_2O$ manufactured by Kojundo Chemical Lab., Co., Ltd., and having a purity of 99%, a specific surface area $S_w$ of 2.1 m²/g, and a specific surface area diameter $d_{BET}$ of 1421 nm, was added, together with 50 cc of zirconia balls, into a 100-cc container made of zirconia. The $Li_2O$ was subjected to dry pulverization at 96 rpm for 24 hours (inside a glove box: dew point value of −90° C.), whereby $Li_2O$ having a specific surface area $S_w$ of 8.4 m²/g and a specific surface area diameter $d_{BET}$ of 355 nm was obtained and used.

$La_2O_3$: Into a 1-L container made of zirconia, 500 cc of 5-mm zirconia balls were added, and ethanol and $La_2O_3$ manufactured by Kojundo Chemical Lab., Co., Ltd., and having a purity of 99.9%, a specific surface area $S_w$ of 1.7 m²/g, and a specific surface area diameter $d_{BET}$ of 543 nm were added and subjected to wet pulverization in an air atmosphere at 80 rpm for 24 hours, whereby $La_2O_3$ having a specific surface area $S_w$ of 11.5 m²/g and a specific surface area diameter $d_{BET}$ of 80 nm was obtained and used.

$ZrO_2$: $ZrO_2$ manufactured by Kojundo Chemical Lab., Co., Ltd., and having a purity of 98%, a specific surface area $S_w$ of 18.4 m²/g, and a specific surface area diameter $d_{BET}$ of 57 nm, was used.

$Ga_2O_3$: $Ga_2O_3$ manufactured by Kojundo Chemical Lab., Co., Ltd., and having a purity of 99.99%, a specific surface area $S_w$ of 10.4 m²/g, and a specific surface area diameter $d_{BET}$ of 90 nm, was used.

Next, these raw materials and a mixture of LiF and $BaF_2$ as a reaction aid (the mole ratio of LiF to $BaF_2$ was 50:50, the specific surface area diameter $d_{BET}$ of the LiF was 649 nm, and the specific surface area diameter $d_{BET}$ of the $BaF_2$ was 137 nm), were put into the grinding mill shown in FIGS. 1A-B. The amount of the reaction aid with respect to 100 parts by mass of the total amount of the raw materials was 10 parts by mass. The bottomed cylindrical container 1 was made of SUS304 and had an inner diameter of 80 mm, and the clearance 4 between the inner circumference of the container 1 and each end blade 3 of the rotor 2 was set to 0.8 mm. This grinding mill was rotated in an air atmosphere at a rotation rate of 4500 rpm with a required power of 3 kW for 12 minutes, to perform mechanochemical treatment. A reached temperature of the container was about 143.8° C.

Production Example 1-2

Mechanochemical treatment was performed in the same manner as production example 1-1, except for that the reaction aid to be used was changed to a mixture of LiF and $BaF_2$ in which the mole ratio of LiF to $BaF_2$ was 75:25.

Production Example 1-3

Mechanochemical treatment was performed in the same manner as production example 1-1, except for that the reaction aid to be used was changed to a mixture of LiF and $BaF_2$ in which the mole ratio of LiF to $BaF_2$ was 85:15 and the grinding mill was rotated at 3 kW for 20 minutes.

Production Example 2-1

Mechanochemical treatment was performed in the same manner as production example 1-1, except for that powders of $Li_2O$, $La_2O_3$, $ZrO_2$, and $Ga_2O_3$ were respectively weighed in a total of 20 g at a stoichiometric ratio such that the composition of a composite metal oxide that was generated was expressed as $Li_{6.25}Ga_{0.25}La_3Zr_2O_{12}$, and the reaction aid to be used was change to a mixture of LiF and $BaF_2$ in which the mole ratio of LiF to $BaF_2$ was 85:15.

Production Example 2-2

Mechanochemical treatment was performed in the same manner as production example 2-1, except for that the reaction aid to be used was changed to a mixture of LiF and $BaF_2$ in which the mole ratio of LiF to $BaF_2$ was 75:25.

Production Example 2-3

Mechanochemical treatment was performed in the same manner as production example 2-1, except for that the added amount of the reaction aid was 6 parts by mass with respect to 100 parts by mass of the total amount of the raw materials and the grinding mill was rotated at 3 kW for 17 minutes.

Figure 2:
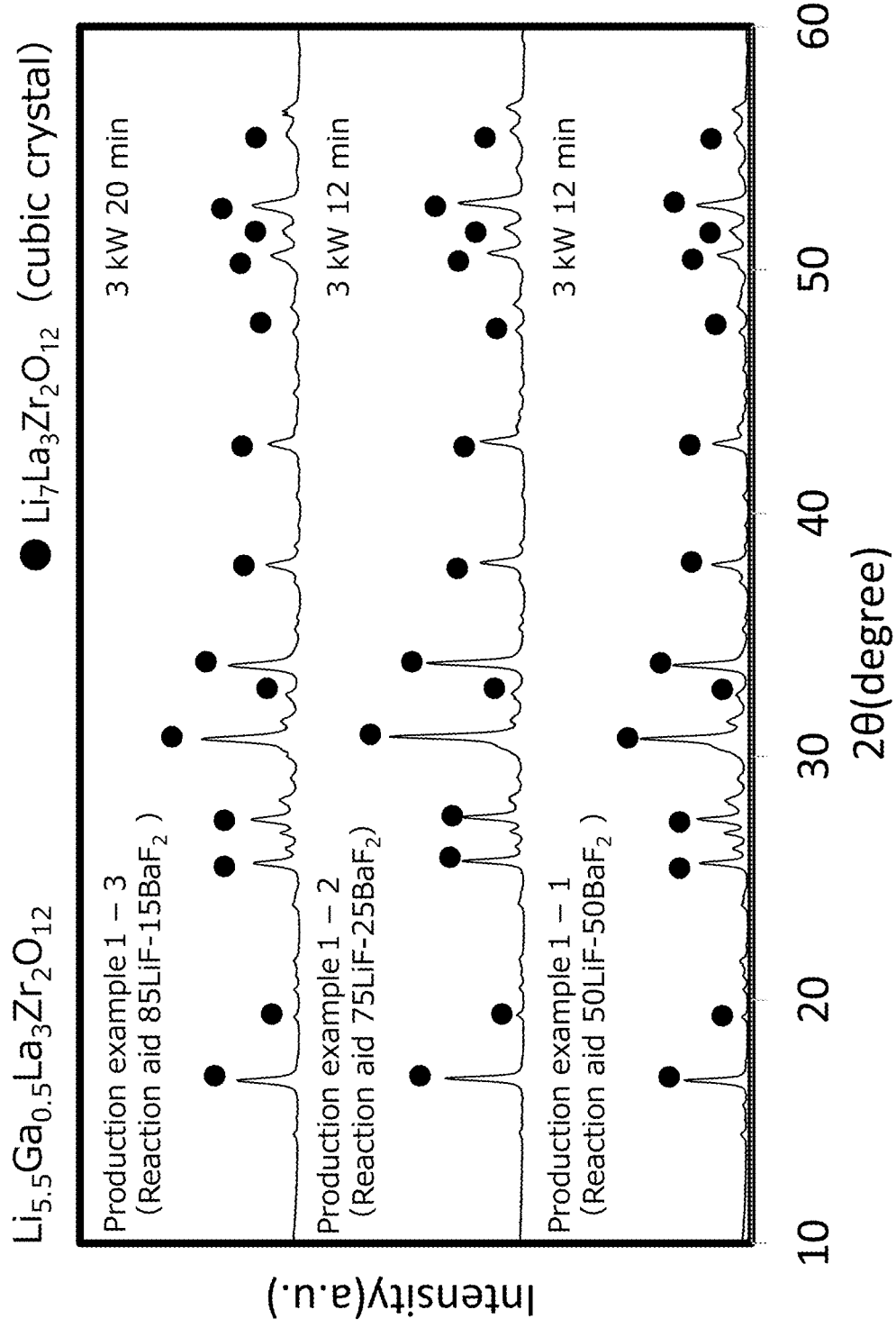
FIG. 2 shows graphs showing results of XRD analysis for samples obtained by production examples described below.

FIG. 2 shows a result of analyzing crystal structures of the samples obtained in production examples 1-1 to 1-3 by using an XRD (X-ray diffraction analysis) device manufactured by Bruker. The measurement was performed with CuK α rays, and λ=1.5418 nm and θ=10 to 50° were satisfied. As a result, it is found that LLZ as cubic crystals in which a part of the Li site had been substituted with Ga was generated in each of the obtained samples. Further, the presence of $BaZrO_3$ was also ascertained in production examples 1-1 to 1-3.

Figure 3:
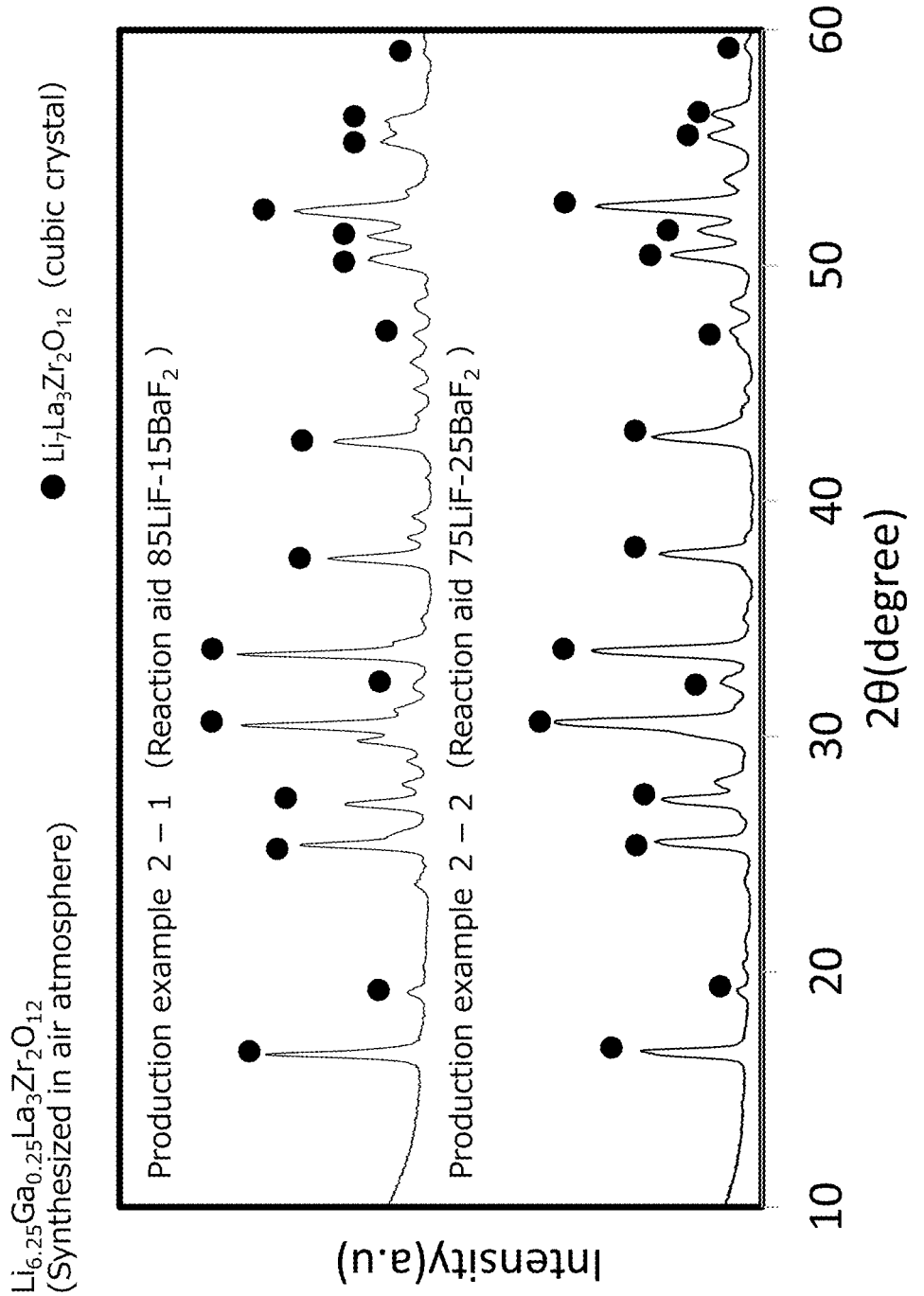
FIG. 3 shows graphs showing results of XRD analysis for samples obtained by production examples described below.
Figure 5B:
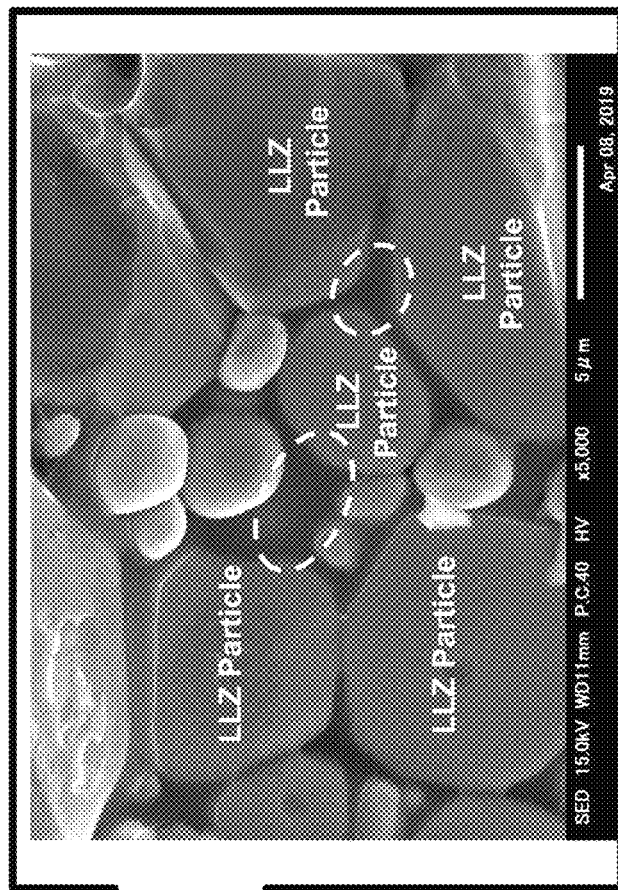
FIGS. 5A-B are substitutional photographs for a drawing, which shows a cross-sectional TEM image of a pellet obtained by an example described below.
Figure 5A:
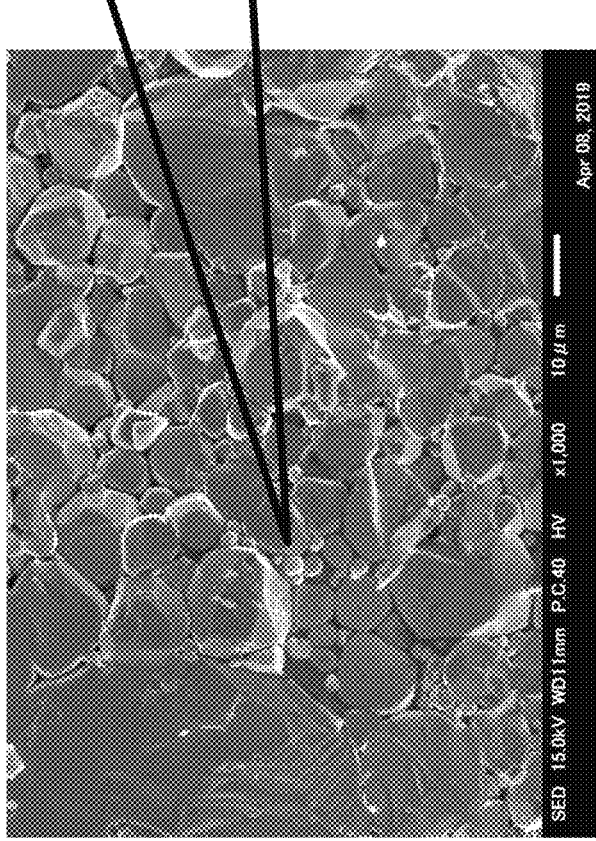
Figure 6A:
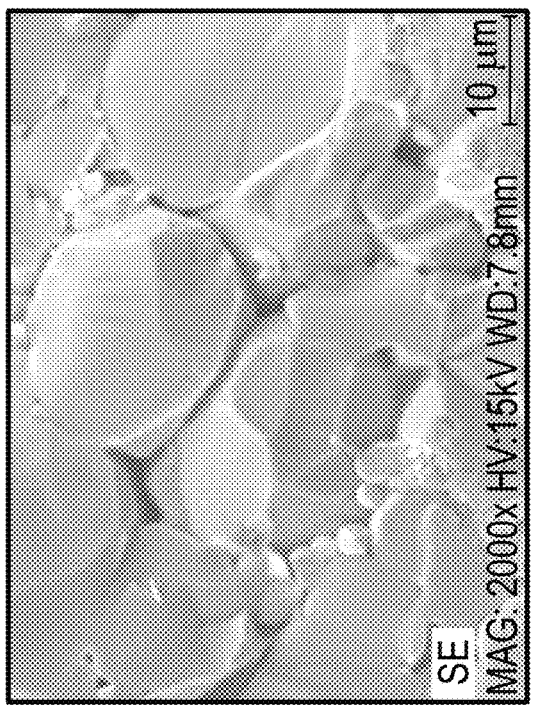
FIGS. 6A-G are drawings showing a result of an EDS analysis for a cross section of a pellet obtained by an example described below.
Figure 6B:
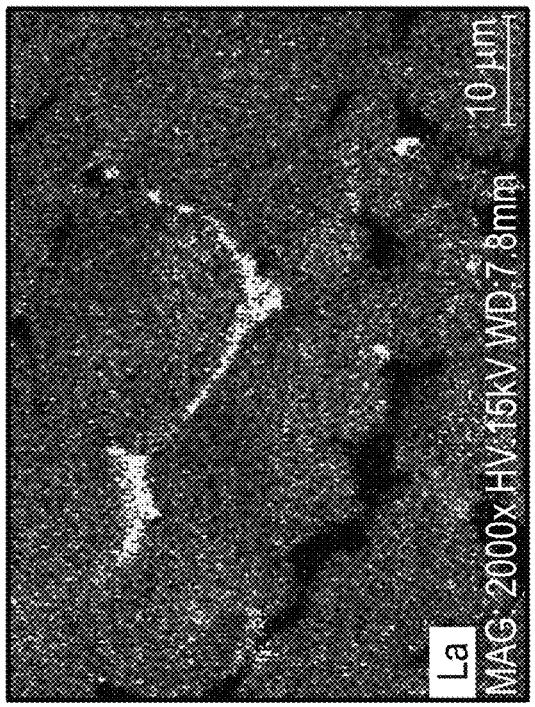
Figure 6C:
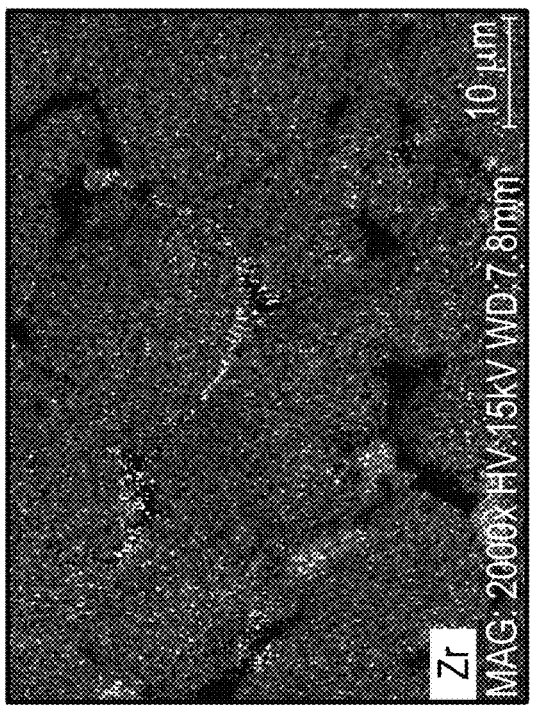
Figure 6D:
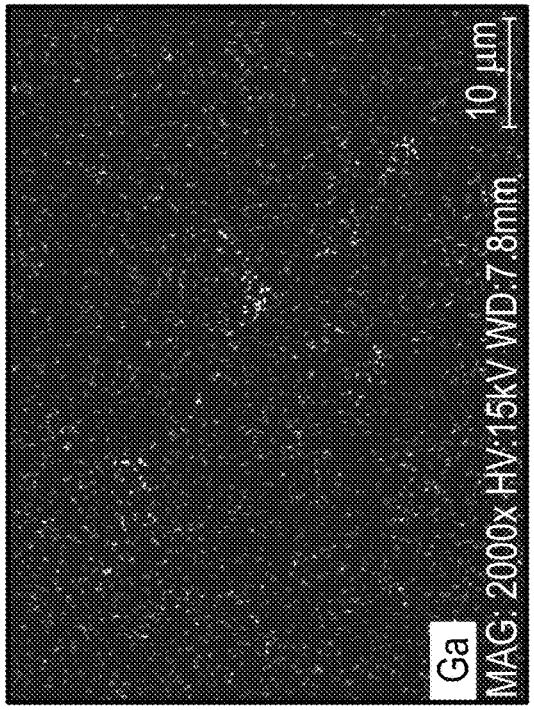
Figure 6F:
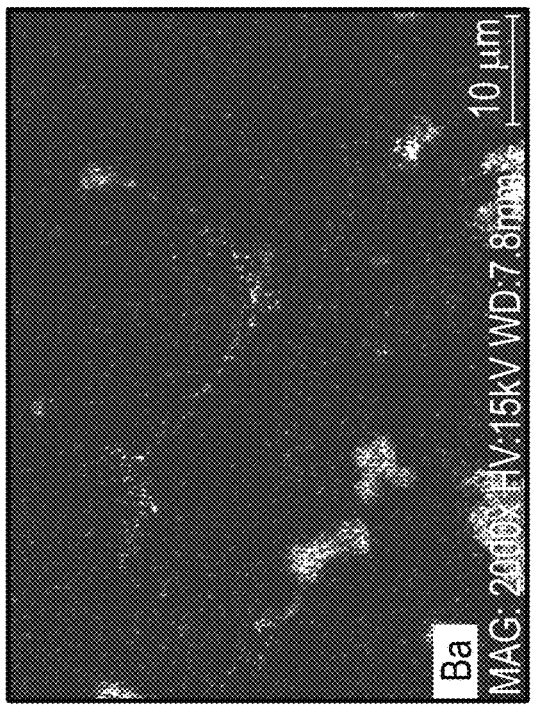
Figure 6E:
Figure 6G:
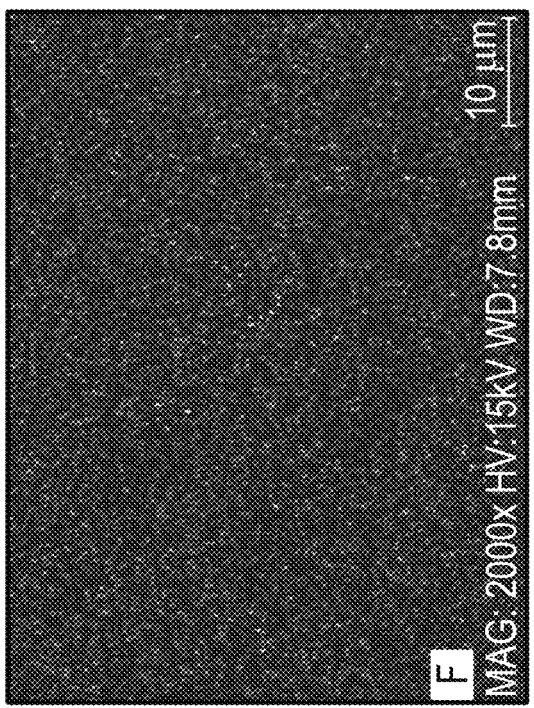
Figure 7A:
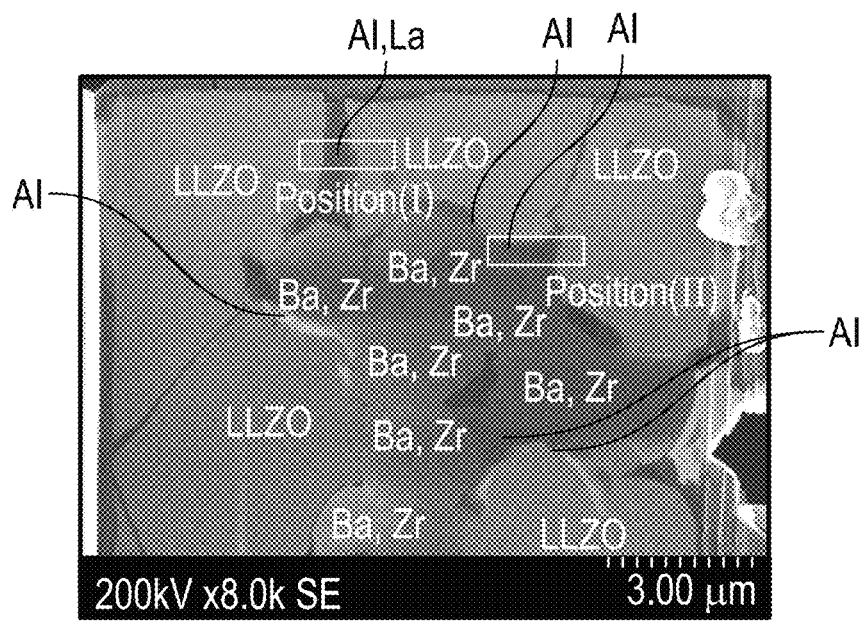
FIGS. 7A-F are drawings showing a result of an EDS analysis for a cross section of a pellet obtained by an example described below.
Figure 7B:
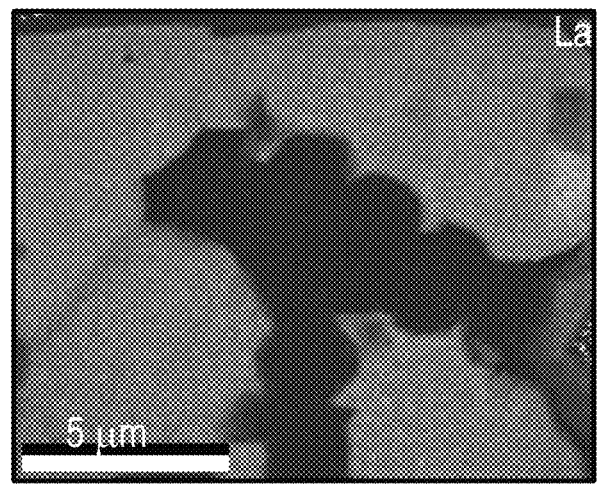
Figure 7C:
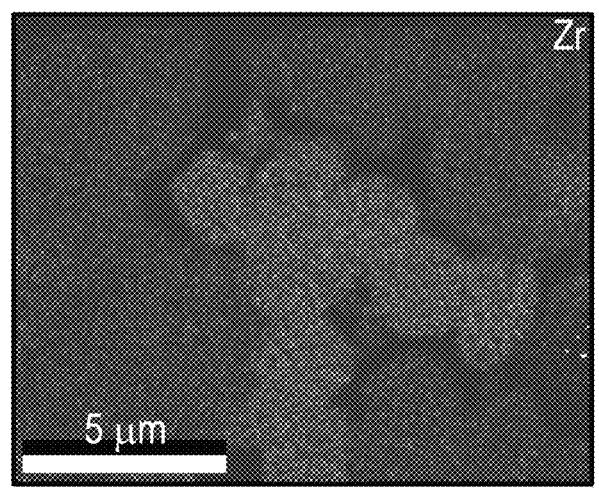
Figure 7D:
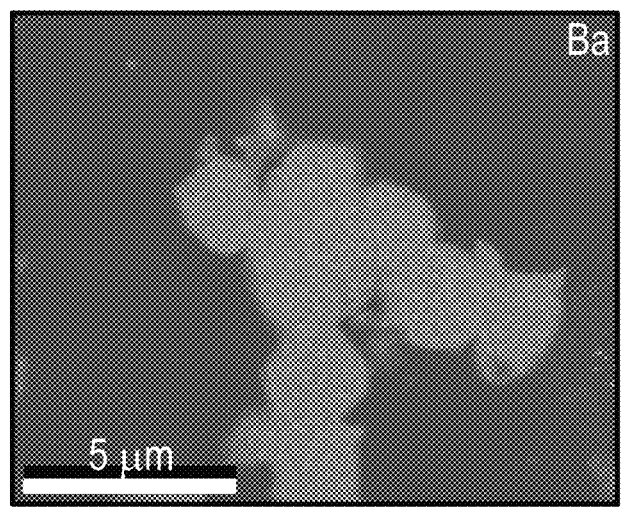
Figure 7E:
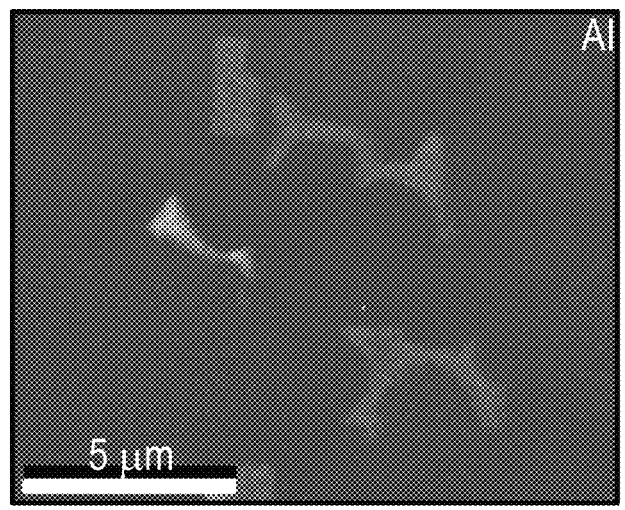
Figure 7F:
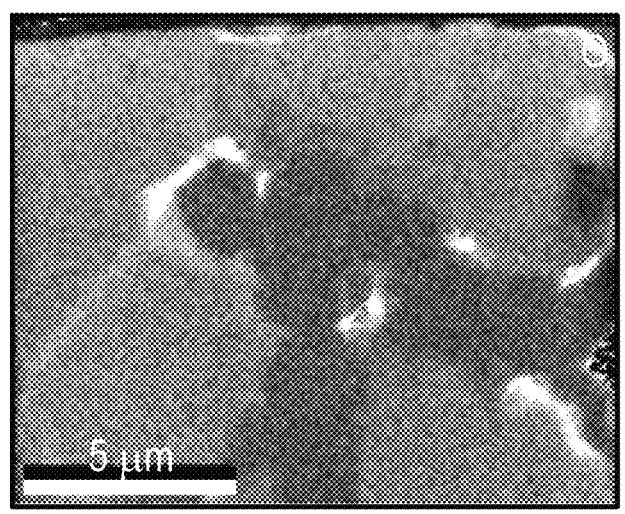

Likewise, FIG. 3 shows a result of analyzing crystal structures of the samples obtained in production examples 2-1 and 2-2. As a result, it is found that, also in production examples 2-1 and 2-2, LLZ as cubic crystals in which a part of the Li site had been substituted with Ga was generated in each of the obtained samples.

Production Example 3-1

Mechanochemical treatment was performed in the same manner as production example 1-1, except for that powders of $Li_2O$, $La_2O_3$, $ZrO_2$, and $Ga_2O_3$ were respectively weighed in a total of 20 g at a stoichiometric ratio such that the composition of a composite metal oxide that was generated was expressed as $Li_{64}Ga_{02}La_3Zr_2O_{12}$, the reaction aid to be used was changed to a mixture of LiF and $YF_3$ in which the mole ratio of LiF to $YF_3$ was 75:25 (the specific surface area diameter $d_{BET}$:649 nm. LiF used below has the same $d_{BET}$ as that of this example) and the grinding mill was rotated at 3 kW for 39 minutes.

Production Example 3-2

Mechanochemical treatment was performed in the same manner as production example 3-1, except for that the reaction aid to be used was changed to a mixture of LiF and $YF_3$ in which the mole ratio of LiF and $YF_3$ was 85:15 and the grinding mill was rotated at 3 kW for 40 minutes.

Production Example 4-1

Mechanochemical treatment was performed in the same manner as production example 1-1, except for that powders of $Li_2O$, $La_2O_3$, $ZrO_2$, and $Ga_2O_3$ were respectively weighed in a total of 20 g at a stoichiometric ratio such that the composition of a composite metal oxide that was generated was expressed as $Li_{64}Ga_{02}La_3Zr_2O_{12}$, the reaction aid to be used was changed to a mixture of LiF and $SrF_2$ in which the mole ratio of LiF to $SrF_2$ was 85:15.

Production Example 5-1

Mechanochemical treatment was performed in the same manner as production example 1-1, except for that powders of $Li_2O$, $La_2O_3$, $ZrO_2$, and $Ga_2O_3$ were respectively weighed in a total of 20 g at a stoichiometric ratio such that the composition of a composite metal oxide that was generated was expressed as $Li_{6.55}Ga_{0.15}La_3Zr_2O_{12}$, the reaction aid to be used was changed to a mixture of LiF and $ScF_3$ in which the mole ratio of LiF to $ScF_3$ was 85:15, and the grinding mill was rotated at 3 kW for 30 minutes.

Examples 1-1 to 1-3, Examples 2-1 to 2-3,
Examples 3-1 and 3-2, Examples 4-1 and 4-2, and
Example 5-1

The sample obtained in each of the above production examples was set in a mold and a pressure of 375 MPa was applied to the sample, whereby a pellet having a diameter of 10 mm and a thickness of about 1 mm was molded. LLZO powder of a tetragonal crystal system was spread all over the bottom of a crucible made of alumina, and the molded pellet was left at rest on the LLZO powder having been spread all over the bottom, in order to suppress volatilization of Li at the time of sintering. Further, the pellet was coated with LLZO powder and sintered in a dry nitrogen atmosphere at 1230° C. for 20 hours, whereby a sintered pellet was obtained. The weight of the sintered pellet was measured, a density was calculated from the dimensions and the weight of the pellet, and the density was divided by 5.11 g/cm$^3$ which was a theoretical density of LLZ, whereby a relative density (%) was calculated. Then, both surfaces of the sintered pellet were polished, and Au was sputtered on the said surfaces in a dry room having a dew point value of −60° C., whereby an electrode having a diameter of 8 mm was formed. In example 4-2, a sample having been subjected to mechanochemical treatment was pulverized, and then the above pellet-molding and sintering were performed, to obtain an increased relative density. In addition, the sintered pellet sample on which an electrode was formed was set in an all-solid-state battery evaluation cell manufactured by Hohsen Corp., and was connected to a potentiostat/galvanostat, impedance measurement was performed within a temperature range from room temperature to 100° C., and an Li$^+$ ion conductivity (S/cm) was evaluated. Further, an activation energy $E_a$ (eV) was calculated from an Arrhenius plot obtained by using an ion conductivity value at each temperature.

In addition, the sintered pellet was pulverized by using a mortar in a glove box and was subjected to crystal structure analysis by using the XRD (X-ray diffraction analysis) device manufactured by Bruker. A value of an interplanar spacing d was obtained and a lattice constant was calculated, according to the following expressions by using a (400)-plane peak among X-ray diffraction peaks of the obtained LLZO.

$$2d \sin \theta = n\lambda \quad (1)$$

$$1/d^2 = (h^2 + k^2 + l^2)/a^2 \quad (2)$$

d: interplanar spacing, a: lattice constant
The results are shown in Table 1.

TABLE 1

| No. | Production example No. | Reaction aid Kind | Reaction aid Added amount | Mechanochemical condition (air atmosphere) | LLZ composition | Lattice constant (Å) | $\sigma_{total}$ S/cm (25° C.) | Relative density (%) | Activation energy Ea (eV) |
|---|---|---|---|---|---|---|---|---|---|
| Example 1-1 | Production example 1-1 | 50LiF-50BaF$_2$ | 10 parts by mass | 3 kW, 12 minutes | $Li_{5.5}Ga_{0.5}La_3Zr_2O_{12}$ | | 2.3 × 10$^{-4}$ | 86 | 0.26 |

TABLE 1-continued

| | Production example | | | | | | | | |
|---|---|---|---|---|---|---|---|---|---|
| | | Reaction aid | | Mechanochemical condition | | Lattice constant | $\sigma_{total}$ S/cm | Relative density | Activation energy |
| No. | No. | Kind | Added amount | (air atmosphere) | LLZ composition | (Å) | (25° C.) | (%) | Ea (eV) |
| Example1-2 | Production example 1-2 | 75LiF-25BaF$_2$ | 10 parts by mass | 3 kW, 12 minutes | Li$_{5.5}$Ga$_{0.5}$La$_3$Zr$_2$O$_{12}$ | 12.99 | 5.1 × 10$^{-4}$ | 92 | 0.21 |
| Example1-3 | Production example 1-3 | 85LiF-15BaF$_2$ | 10 parts by mass | 3 kW, 20 minutes | Li$_{5.5}$Ga$_{0.5}$La$_3$Zr$_2$O$_{12}$ | 13.05 | 5.3 × 10$^{-4}$ | 84 | 0.23 |
| Example2-1 | Production example 2-1 | 85LiF-15BaF$_2$ | 10 parts by mass | 3 kW, 12 minutes | Li$_{6.25}$Ga$_{0.25}$La$_3$Zr$_2$O$_{12}$ | 12.97 | 6.4 × 10$^{-4}$ | 84 | 0.28 |
| Example2-2 | Production example 2-2 | 75LiF-25BaF$_2$ | 10 parts by mass | 3 kW, 12 minutes | Li$_{6.25}$Ga$_{0.25}$La$_3$Zr$_2$O$_{12}$ | 13.08 | 5.0 × 10$^{-4}$ | 90 | 0.27 |
| Example2-3 | Production example 2-3 | 85LiF-15BaF$_2$ | 6 parts by mass | 3 kW, 17 minutes | Li$_{6.25}$Ga$_{0.25}$La$_3$Zr$_2$O$_{12}$ | 12.98 | 4.7 × 10$^{-4}$ | 65 | 0.25 |
| Example3-1 | Production example 3-1 | 75LiF-25YF$_3$ | 10 parts by mass | 3 kW, 39 minutes | Li$_{6.4}$Ga$_{0.2}$La$_3$Zr$_2$O$_{12}$ | 13.05 | 2.2 × 10$^{-4}$ | 88 | 0.32 |
| Example3-2 | Production example 3-2 | 85LiF-15YF$_3$ | 10 parts by mass | 3 kW, 40 minutes | Li$_{6.4}$Ga$_{0.2}$La$_3$Zr$_2$O$_{12}$ | 13.07 | 3.1 × 10$^{-4}$ | 90 | 0.31 |
| Example4-1 | Production example 4-1 | 85LiF-15SrF$_2$ | 10 parts by mass | 3 kW, 12 minutes | Li$_{6.4}$Ga$_{0.2}$La$_3$Zr$_2$O$_{12}$ | 12.98 | 5.0 × 10$^{-4}$ | 72 | 0.24 |
| Example4-2 | Production example 4-1 | 85LiF-15SrF$_2$ | 10 parts by mass | 3 kW, 12 minutes | Li$_{6.4}$Ga$_{0.2}$La$_3$Zr$_2$O$_{12}$ | 13.03 | 5.3 × 10$^{-4}$ | 90 | 0.22 |
| Example5-1 | Production example 5-1 | 85LiF-15ScF$_3$ | 10 parts by mass | 3 kW, 30 minutes | Li$_{6.55}$Ga$_{0.15}$La$_3$Zr$_2$O$_{12}$ | 13.00 | 3.6 × 10$^{-4}$ | 90 | 0.29 |

Table 1 indicates that each example had a favorable Li$^+$ ion conductivity of not lower than 1.0×10$^{-4}$ S/cm. In addition, it has been also found that a higher proportion of LiF leads to a higher Li$^+$ ion conductivity.

FIGS. 4A-B and FIGS. 5A-B show photographs that serve as substitutes for drawings and that show images in which cross sections of the pellet of example 2-1 were observed with a TEM (transmission electron microscope having a magnification of 10000-fold). FIG. 4A shows images obtained by an SE (secondary electron) detector, and FIG. 4B shows images (composition images) obtained by an ESB detector (energy selected backscatter detector). Phases obviously different from the phase of LLZ were observed around the centers of portions enclosed by dotted lines in FIGS. 4A-B and FIGS. 5A-B.

FIGS. 6A-G show results of performing EDS analysis on the cross sections of the pellet of example 2-1. A portion in which La, Zr, and O were present, a portion in which Ba and Zr were present, and a portion in which Al was present, were observed near LLZ particle interfaces. BaZrO$_3$ was detected in a result of XRD analysis in example 2-1 described later, and the portion in which Ba and Zr were present is considered to be BaZrO$_3$.

FIGS. 7A-F show results of performing TEM-EDS (energy dispersive X-ray spectrometry) analysis on the cross sections in example 2-1. According to FIGS. 7A-F, phases including La were observed in an interface of an LLZ phase, and Al was also detected in the phases including La.

FIGS. 8A-E show TEM-EELS maps at a position (I) and a position (II) in FIGS. 7A-F. At each of the positions (I) and (II) in FIGS. 8A-E, the presence of LiF was ascertained in a center portion of the EELS map (a bright portion in the center portion of the EELS map), and the presence of LiF was ascertained in a phase that was present in the interface of the LLZ phase and that was different from the LLZ phase.

Figure 9:
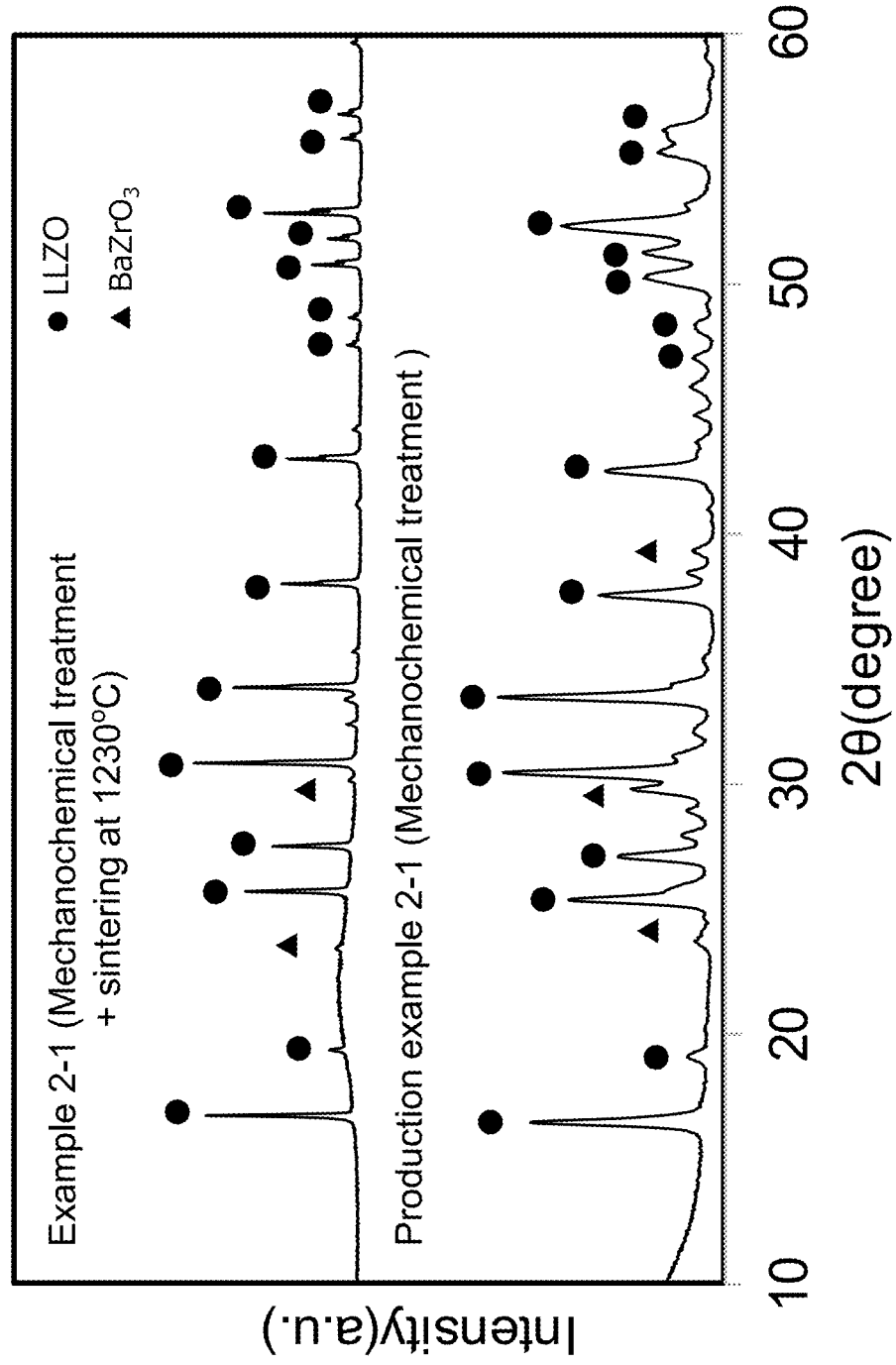
FIG. 9 shows graphs showing results of an XRD analysis for samples obtained by a production example and an example described below.

FIG. 9 shows a result of performing, by using the XRD (X-ray diffraction analysis) device manufactured by Bruker, analysis on crystal structures of the samples obtained in production example 2-1 and example 2-1. In example 2-1 resulting from further performing sintering in production example 2-1, the width at half maximum of each peak corresponding to LLZ is reduced, and it has been found that crystallinity was improved by sintering. In addition, the presence of BaZrO$_3$ was ascertained in each of production example 2-1 and example 2-1.

Figure 10:
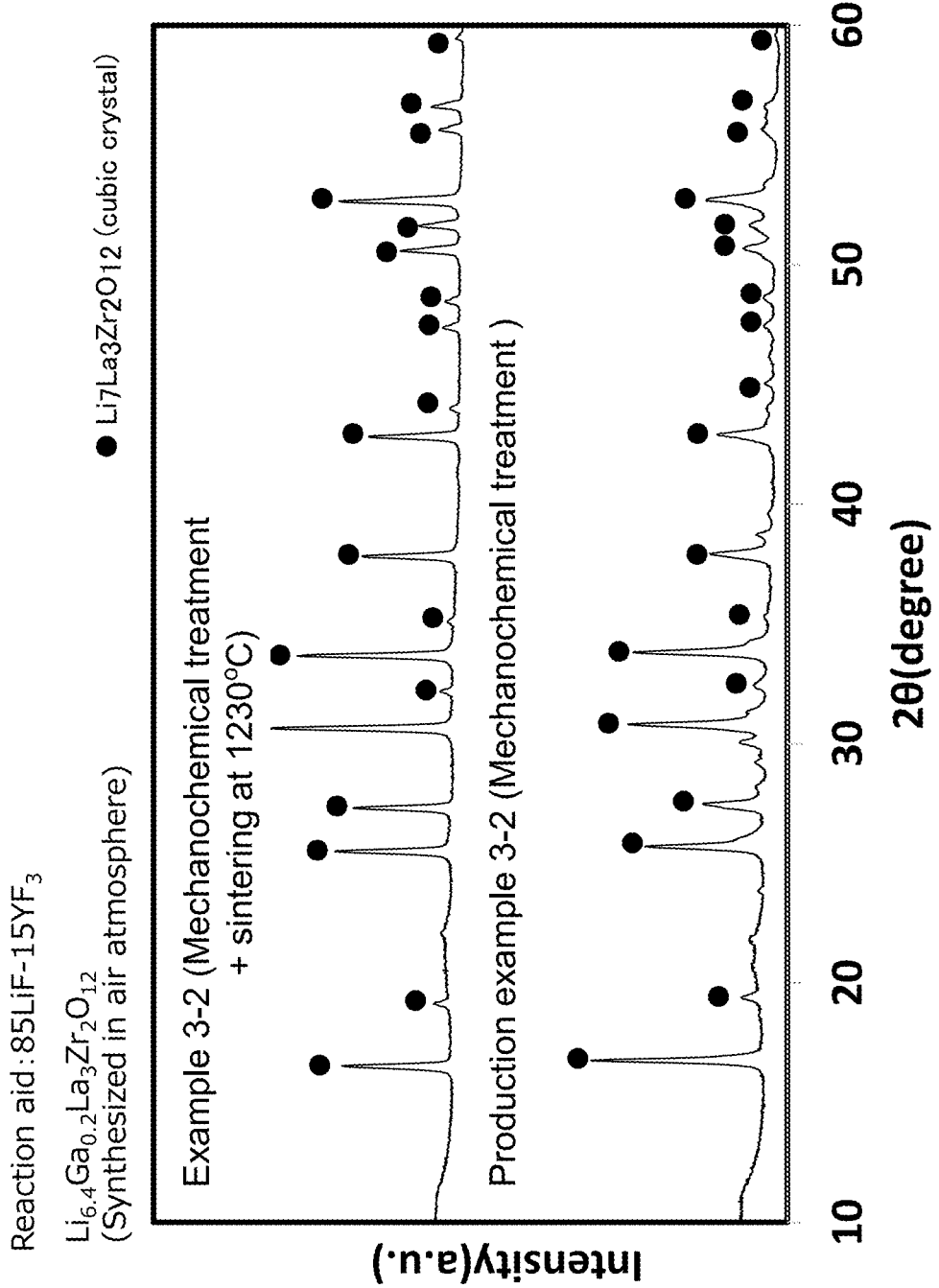
FIG. 10 shows graphs showing results of an XRD analysis for samples obtained by a production example and an example described below.
Figure 11B:
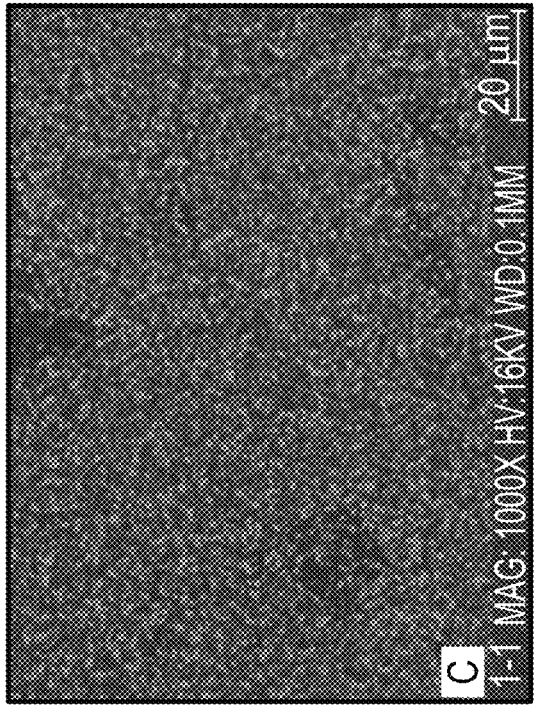
FIGS. 11A-J are drawings showing a result of a cross-sectional EDS analysis for a pellet obtained by an example described below.
Figure 11D:
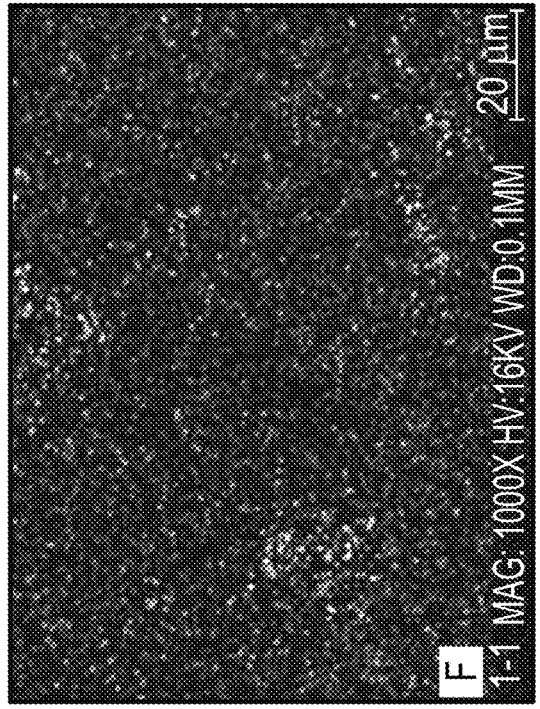
Figure 11A:
Figure 11C:
Figure 11F:
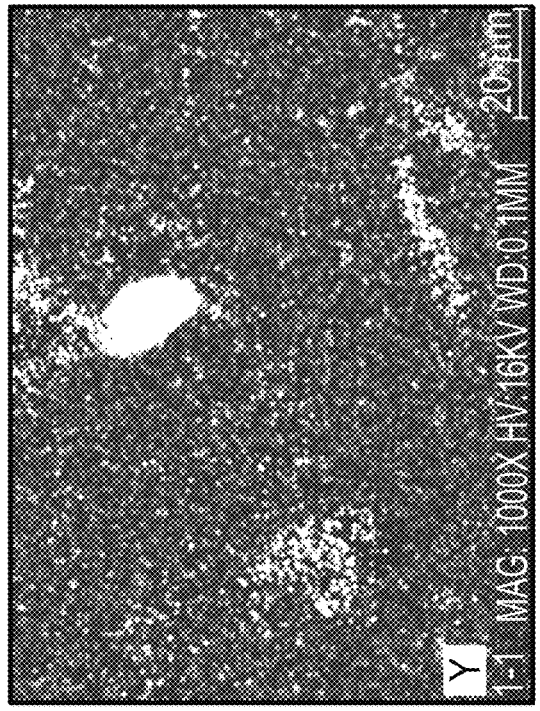
Figure 11H:
Figure 11E:
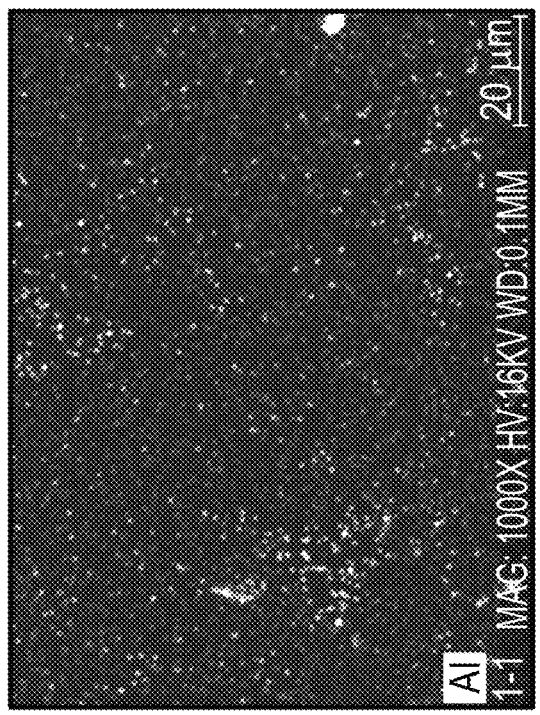
Figure 11G:
Figure 11I:
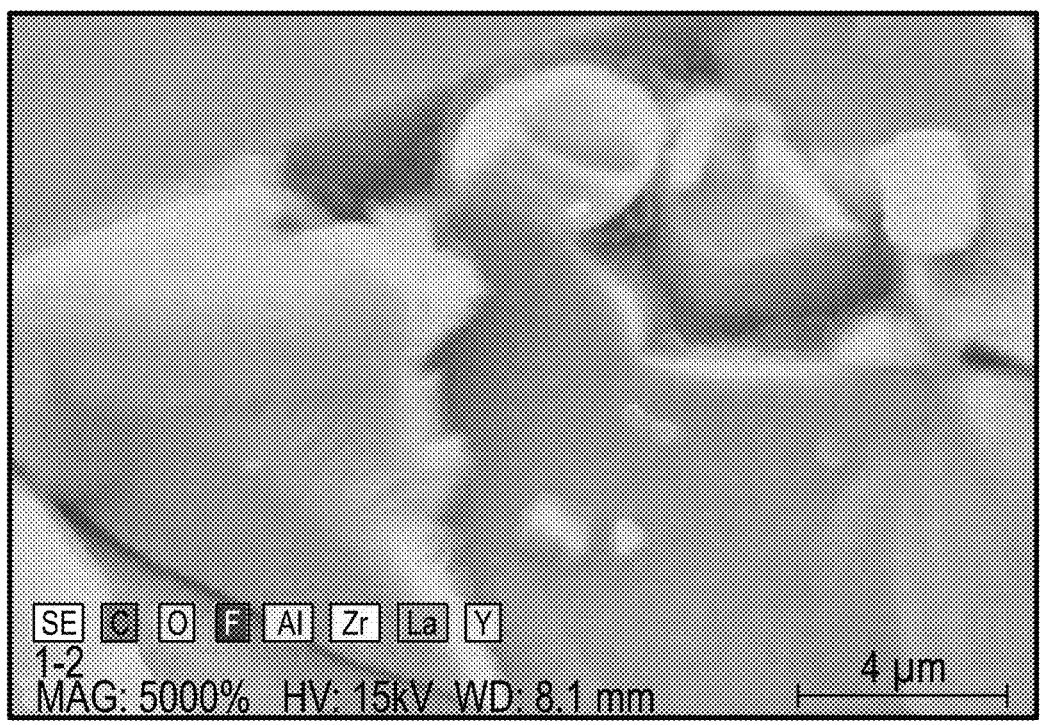
Figure 11J:
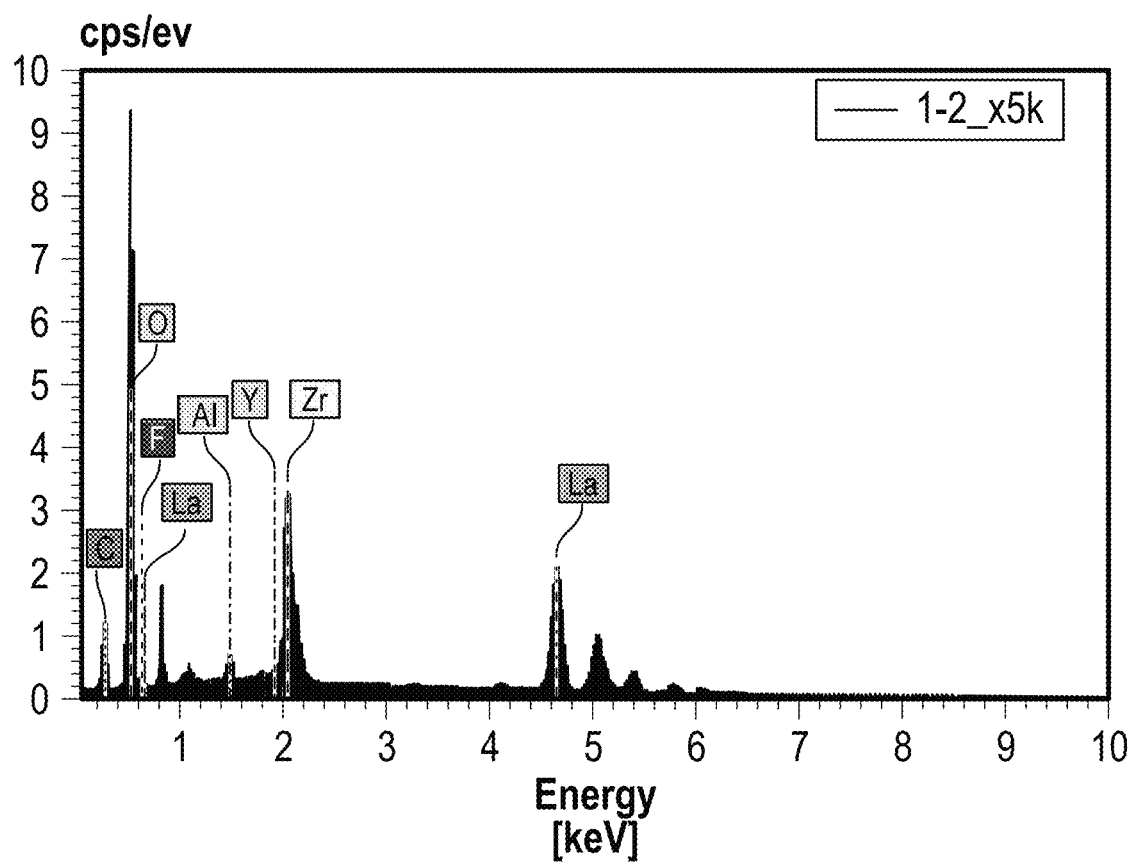

FIG. 10 shows a result of performing, by using the XRD (X-ray diffraction analysis) device manufactured by Bruker, analysis on crystal structures of the samples obtained in production example 3-2 and example 3-2. In example 3-2 resulting from further performing sintering in production example 3-2, the width at half maximum of each peak corresponding to LLZ is reduced, and it has been found that crystallinity was improved by sintering.

FIGS. 11A-J show results of performing EDS analysis on cross sections of the pellet of example 3-2. The presence of Y and F was ascertained, and Y and F were observed at the same position in an LLZ interface. Thus, YF$_3$ is considered to have been formed.

Figure 12:
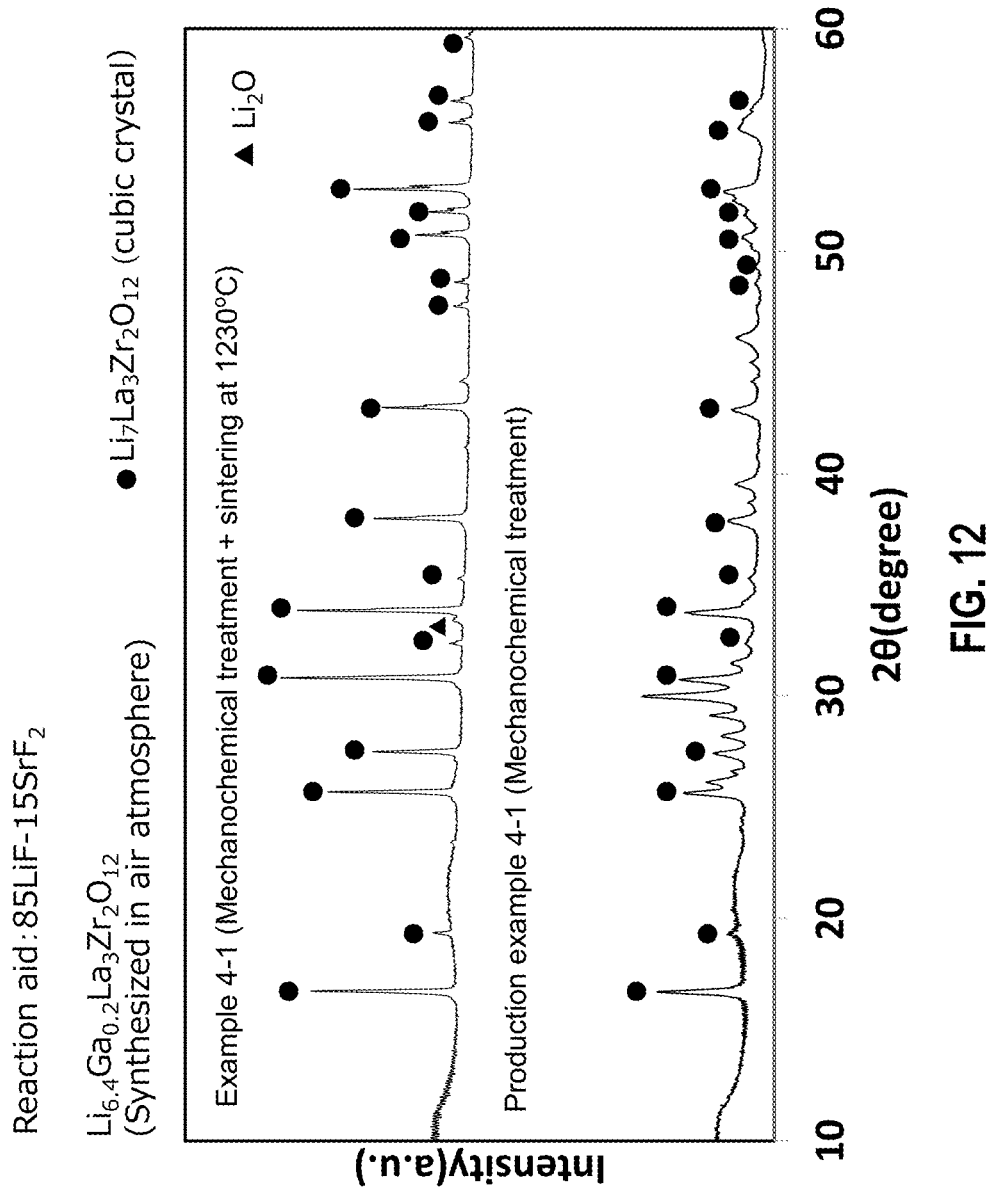
FIG. 12 shows graphs showing results of an XRD analysis for samples obtained by a production example and an example described below.
Figure 13B:
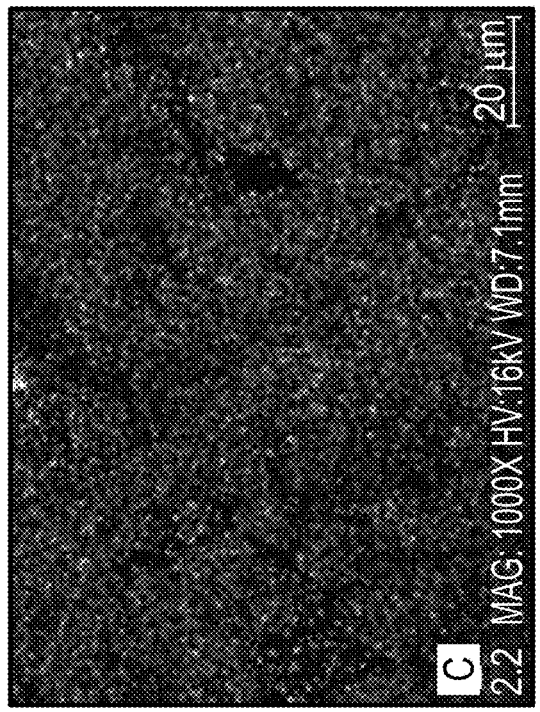
FIGS. 13A-K are drawings showing a result of a cross-sectional EDS analysis for a pellet obtained by an example described below.
Figure 13D:
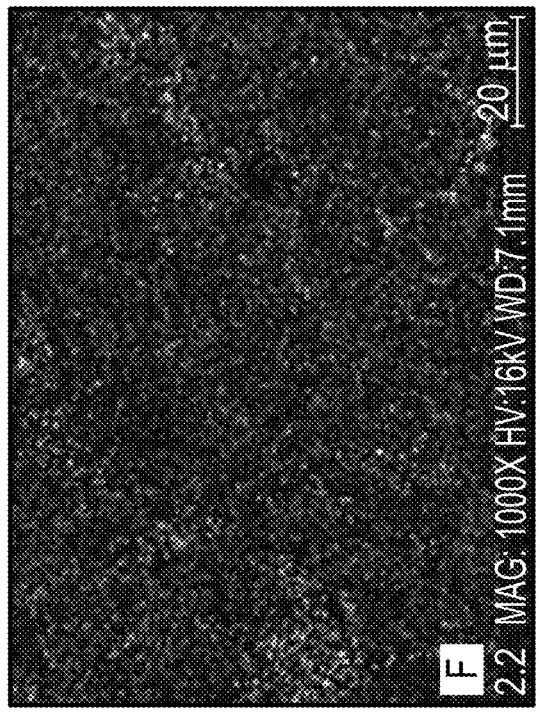
Figure 13A:
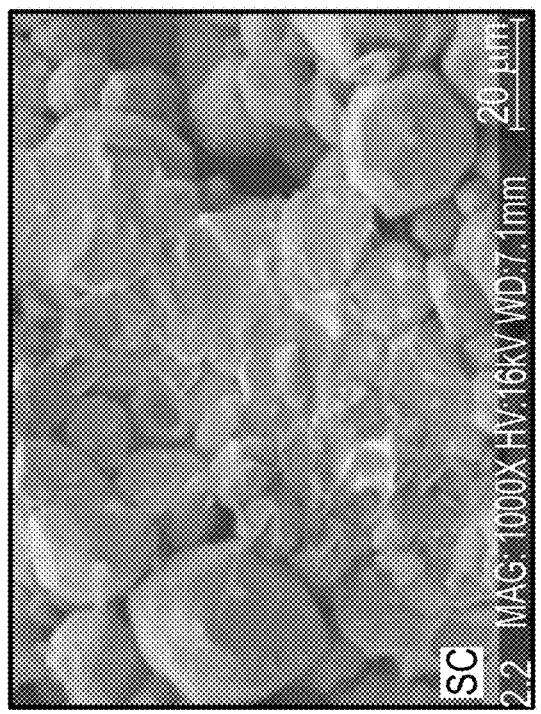
Figure 13C:
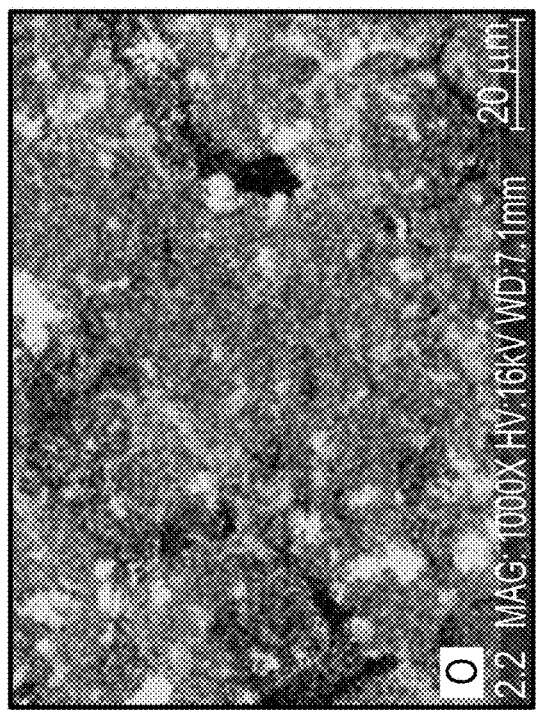
Figure 13E:
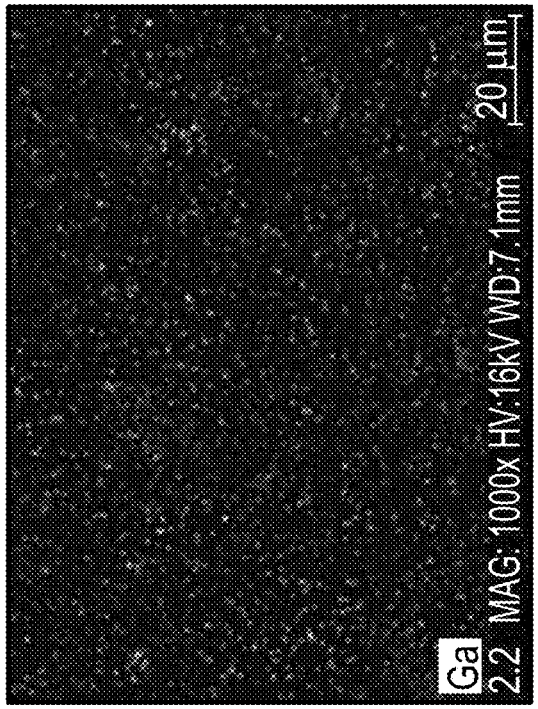
Figure 13F:
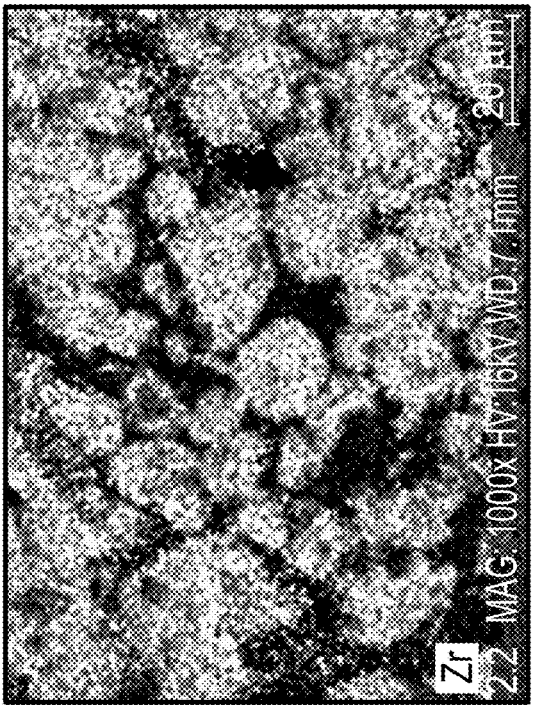
Figure 13G:
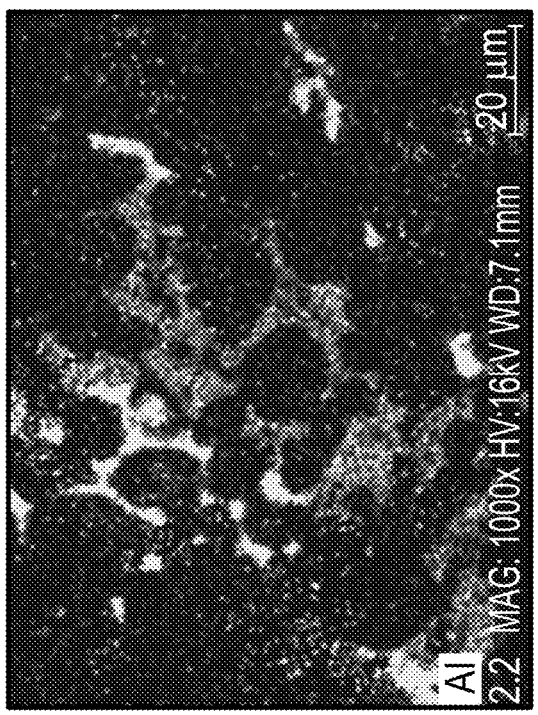
Figure 13H:
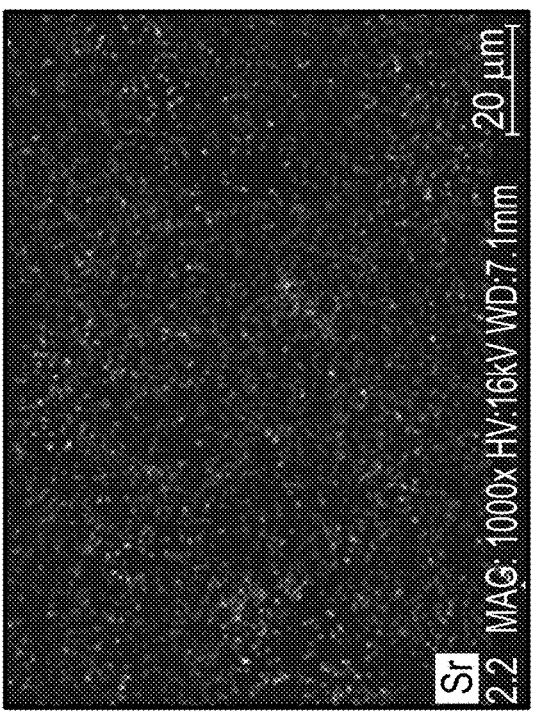
Figure 13I:
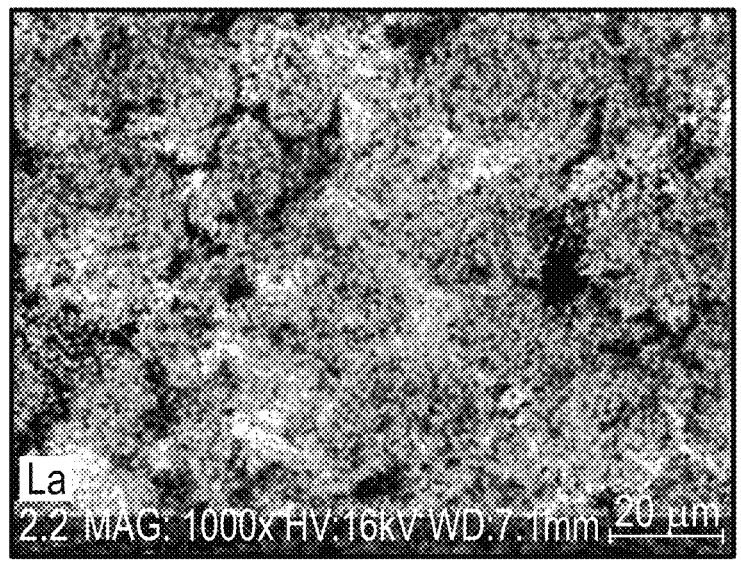
Figure 13J:
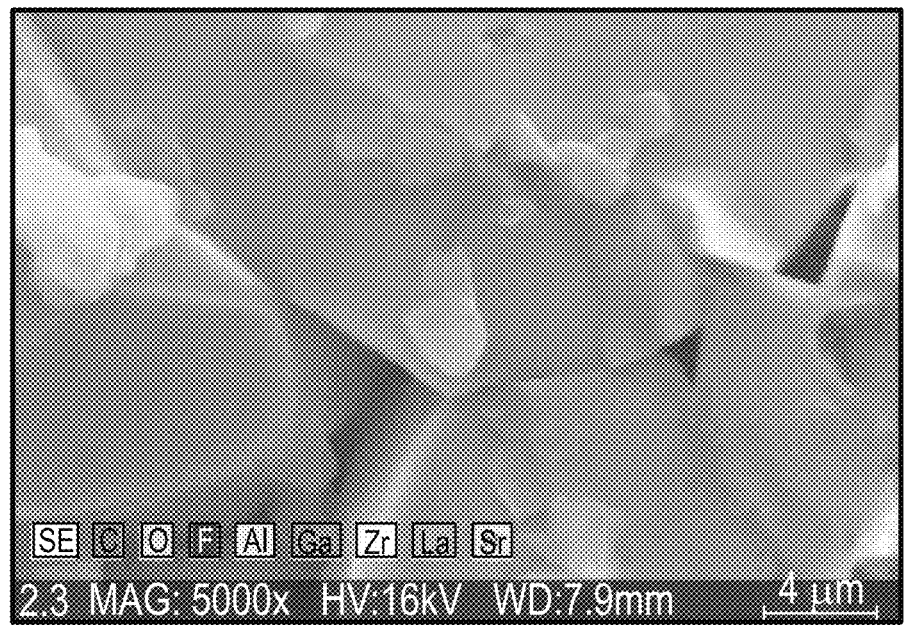
Figure 13K:
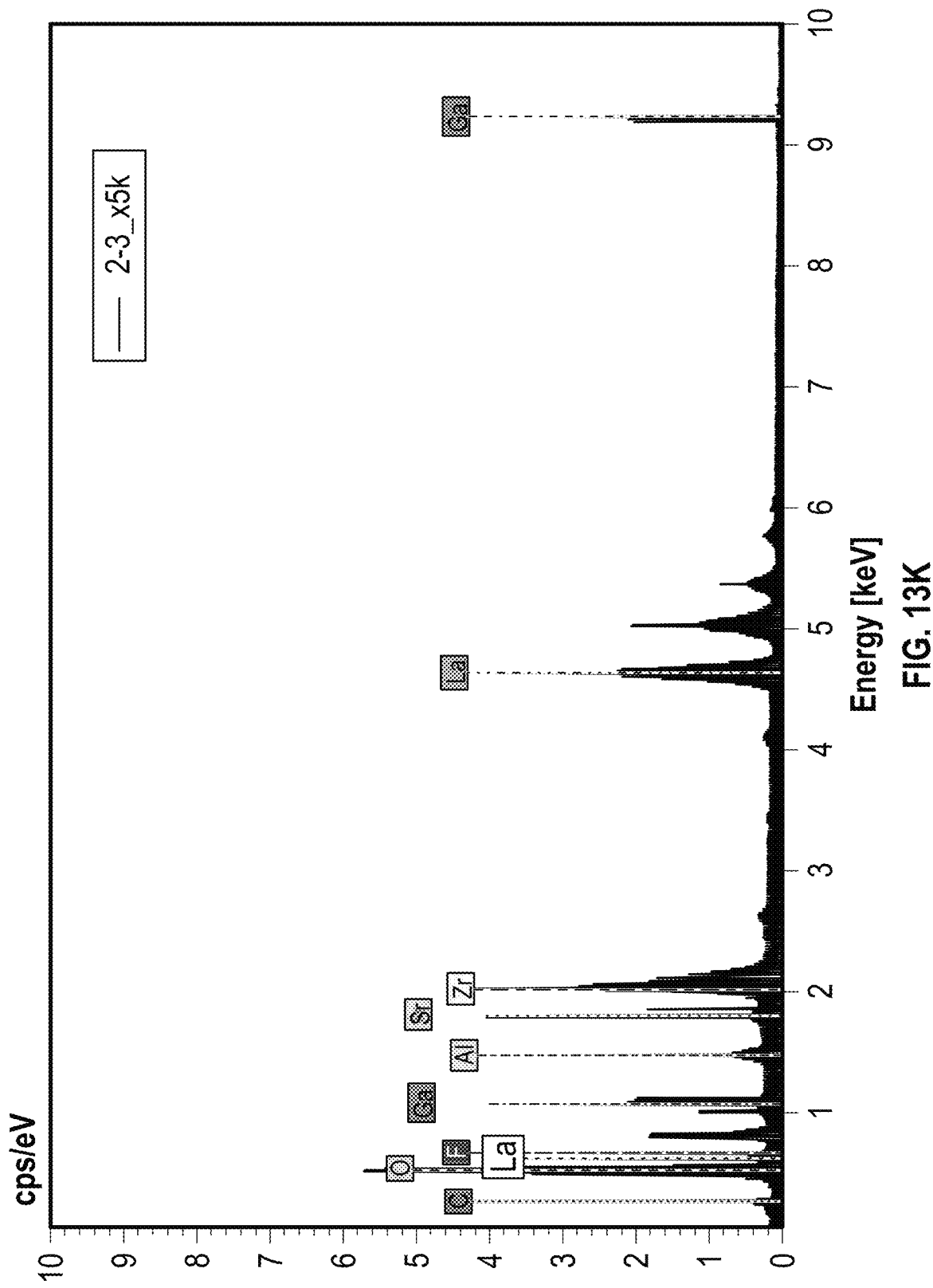

FIG. 12 shows a result of performing, by using the XRD (X-ray diffraction analysis) device manufactured by Bruker, analysis on crystal structures of the samples obtained in production example 4-1 and example 4-1. In example 4-1 resulting from further performing sintering in production example 4-1, the width at half maximum of each peak corresponding to LLZ is reduced, and it has been found that crystallinity was improved by sintering. In addition, the presence of Li$_2$O was also ascertained in example 4-1.

FIGS. 13A-K show results of performing EDS analysis on cross sections of the pellet of example 4-1. The presence of Sr and F was ascertained, and Sr and F were observed at the same position in an LLZ interface. Thus, SrF$_2$ is considered to have been formed. Meanwhile, no other element was observed at a position at which O was observed, and furthermore, Li is a light element and it is difficult to ascertain the presence of Li through EDS analysis. Considering these facts together with the above result in FIG. 12, it can be determined that Li$_2$O was present in a part of the position at which 0 was present.

Figure 14:
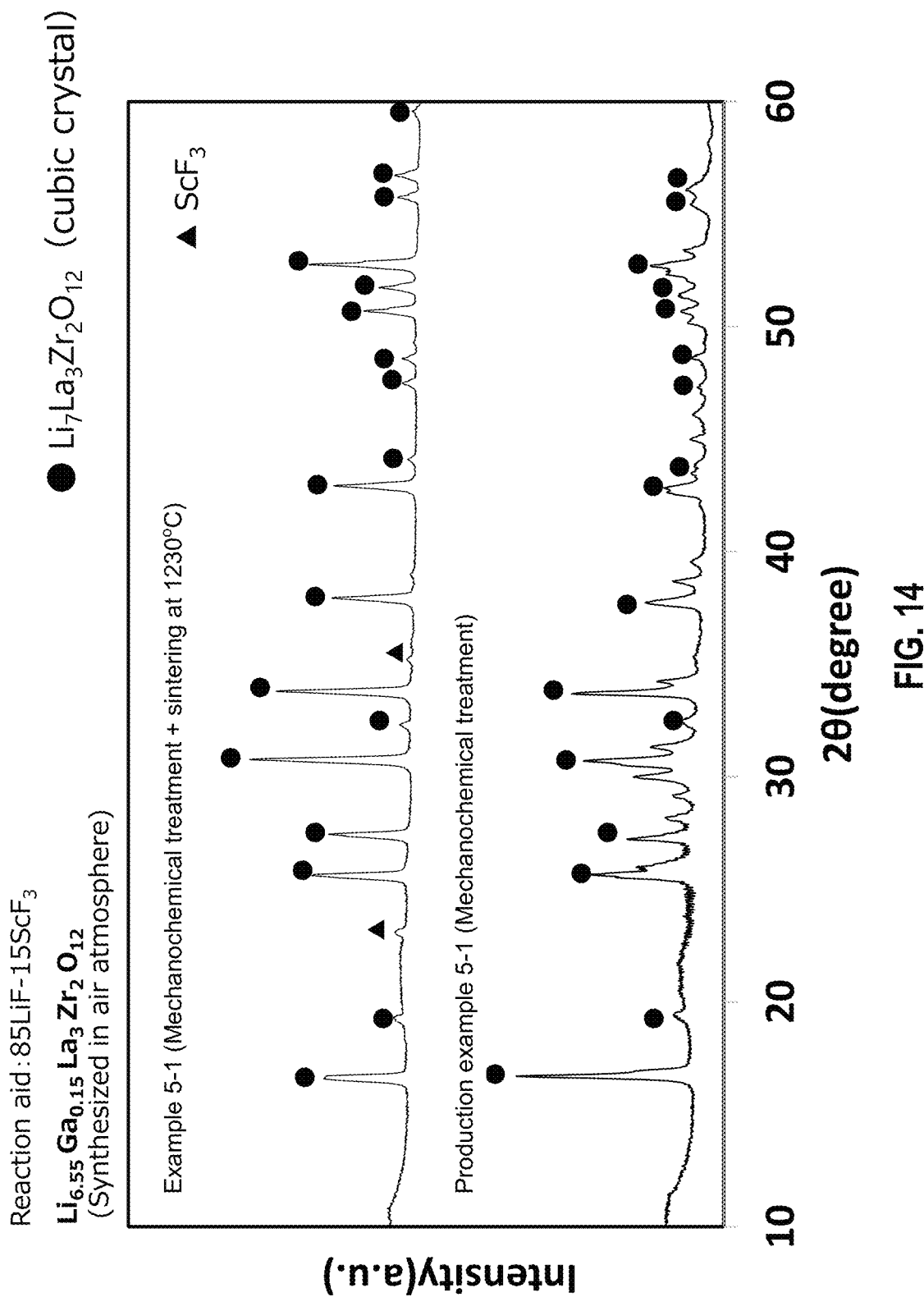
FIG. 14 shows graphs showing results of an XRD analysis for samples obtained by a production example and an example described below.

FIG. 14 shows a result of performing, by using the XRD (X-ray diffraction analysis) device manufactured by Bruker, analysis on crystal structures of the samples obtained in production example 5-1 and example 5-1. In example 5-1 resulting from further performing sintering in production example 5-1, the width at half maximum of each peak corresponding to LLZ is reduced, and it has been found that crystallinity was improved by sintering. The presence $ScF_3$ can also be ascertained in example 5-1.

DESCRIPTION OF SYMBOLS 1 bottomed cylindrical container
2 rotor
3 end blade
4 clearance
5 mixture of raw material powders and reaction aid Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A solid electrolyte comprising:
   a garnet-type composite metal oxide phase (L); and
   a phase (D) different from the phase (L),
   wherein:
   the phase (L) contains Li, La, Zr, O, and Ga,
   an Li site in the phase (L) is substituted with the Ga,
   a lattice constant of the solid electrolyte is not smaller than 12.96 Å, and
   the phase (D) contains at least one selected from the group consisting of LiF, $BaZrO_3$, $YF_3$, $SrF_2$, and $ScF_3$.

2. The solid electrolyte according to claim 1, wherein when the phase (D) contains the LiF, the phase (D) further contains at least one of elements Al and La.

3. The solid electrolyte according to claim 1, wherein the phase (D) is present in at least a part of an interface of the phase (L).

4. The solid electrolyte according to claim 1, wherein an $Li^+$ ion conductivity of the solid electrolyte is not lower than $1.0 \times 10^{-4}$ S/cm.

5. A solid electrolyte comprising a garnet-type composite metal oxide phase (L), wherein:
   the solid electrolyte is synthesized by performing mechanochemical treatment on a raw material mixture containing Li source powder, La source powder, Zr source powder, and Ga source powder in presence of a reaction aid containing a mixture of $LiX^1$ and $MX^2_p$,
   each of $X^1$ and $X^2$ is F, Cl, Br, or I, $X^1$ and $X^2$ is identical to each other or different from each other, M is Ba, Y, Sr, or Sc, and p is a value equal to an atomic valence of M,
   the phase (L) contains Li, La, Zr, O, and Ga, and
   a part of an Li site in the phase (L) is substituted with the Ga.

6. The solid electrolyte according to claim 5, wherein each of the $X^1$ and the $X^2$ is F.

7. The solid electrolyte according to claim 5, wherein:
   the solid electrolyte further comprises a phase (D) different from the phase (L),
   the phase (D) contains a compound containing at least one of constituent elements of the reaction aid, and
   the phase (D) is present in at least a part of an interface of the phase (L).

8. The solid electrolyte according to claim 5, wherein an amount of the reaction aid with respect to a total of 100 parts by mass of the raw material mixture is not larger than 15 parts by mass.

9. The solid electrolyte according to claim 5, wherein the solid electrolyte has been sintered at 1100 to 1350° C. for 10 to 30 hours after the mechanochemical treatment.

10. The solid electrolyte according to claim 5, wherein an $Li^+$ ion conductivity of the solid electrolyte is not lower than $1.0 \times 10^{-4}$ S/cm.

* * * * *